United States Patent
Wee et al.

(10) Patent No.: US 11,533,092 B2
(45) Date of Patent: Dec. 20, 2022

(54) WIRELESS COMMUNICATION APPARATUS AND WIRELESS COMMUNICATION METHOD

(71) Applicant: Panasonic Intellectual Property Corporation of America, Torrance, CA (US)

(72) Inventors: Yao Huang Gaius Wee, Singapore (SG); Hiroyuki Motozuka, Kanagawa (JP); Masataka Irie, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 148 days.

(21) Appl. No.: 16/614,818

(22) PCT Filed: May 17, 2018

(86) PCT No.: PCT/JP2018/019003
§ 371 (c)(1),
(2) Date: Nov. 19, 2019

(87) PCT Pub. No.: WO2018/230240
PCT Pub. Date: Dec. 20, 2018

(65) Prior Publication Data
US 2020/0313740 A1    Oct. 1, 2020

Related U.S. Application Data

(60) Provisional application No. 62/521,107, filed on Jun. 16, 2017.

(30) Foreign Application Priority Data

Apr. 27, 2018    (JP) .............................. JP2018-086877

(51) Int. Cl.
*H04W 8/00*    (2009.01)
*H04B 7/06*    (2006.01)
(Continued)

(52) U.S. Cl.
CPC .......... *H04B 7/0617* (2013.01); *H04W 8/005* (2013.01); *H04W 16/28* (2013.01); *H04W 28/06* (2013.01); *H04W 48/16* (2013.01)

(58) Field of Classification Search
CPC ..... H04W 8/005; H04W 16/28; H04W 28/06; H04W 48/16; H04B 7/0617
(Continued)

(56) References Cited

U.S. PATENT DOCUMENTS 11,133,856 B2    9/2021    Li et al.
2010/0103045 A1    4/2010    Liu et al.
(Continued)

FOREIGN PATENT DOCUMENTS

EP    3038272 A1    6/2016
EP    3852281 A1    7/2021
(Continued)

OTHER PUBLICATIONS

Gaius Wee, "Unsolicited RSS after BTI" Oct. 18, 2017, Panasonic Corporation, pp. 1-5 (Year: 2017).*
(Continued)

*Primary Examiner* — Chuck Huynh
(74) *Attorney, Agent, or Firm* — Seed IP Law Group LLP

(57) ABSTRACT

In a case where an A-BFT period is not present in a BI, a PCP/AP uses a format that includes an Unsolicited RSS Enabled sub-field for indicating support for responding to unsolicited RSSs within a CBAP, for a Beacon Interval Control field of a DMG beacon frame used for executing a BTI-ISS. For example, in a case where it is indicated that responding to unsolicited RSSs within a CBAP is supported,
(Continued)

the PCP/AP sets the value of the Unsolicited RSS Enabled sub-field to 1. In a case where the value of the Unsolicited RSS Enabled sub-field included in a received DMG beacon frame is 1, a STA responds with an unsolicited CBAP-RSS.

8 Claims, 32 Drawing Sheets

(51) Int. Cl.
    *H04W 16/28*    (2009.01)
    *H04W 28/06*    (2009.01)
    *H04W 48/16*    (2009.01)

(58) Field of Classification Search
    USPC .......................................................... 370/329
    See application file for complete search history.

(56) References Cited

U.S. PATENT DOCUMENTS

| | | |
|---|---|---|
| 2010/0157955 A1 | 6/2010 | Liu et al. |
| 2017/0118656 A1 | 4/2017 | Xin et al. |
| 2017/0126303 A1 | 5/2017 | Jo et al. |
| 2020/0008089 A1 | 1/2020 | Yun et al. |

FOREIGN PATENT DOCUMENTS

| | | |
|---|---|---|
| JP | 2012-507946 | 3/2012 |
| WO | 2010/053738 | 5/2010 |
| WO | 2017/008044 A1 | 1/2017 |
| WO | 2020/052458 A1 | 3/2020 |

OTHER PUBLICATIONS

International Search Report of PCT application No. PCT/JP2018/019003 dated Jul. 24, 2018.

IEEE Std 802.11(TM)-2016, IEEE Standard for Information technology—Telecommunications and information exchange between systems, Local and metropolitan area networks—Specific requirements, Part 11: Wireless LAN Medium Access Control (MAC) and Physical Layer (PHY) Specifications, Dec. 14, 2016.

IEEE Std 802.11ad(TM)-2012, IEEE Standard for Information Technology—Telecommunications and information exchange between systems, Local and metropolitan area networks—Specific requirements, Part 11: Wireless LAN Medium Access Control (MAC) and Physical Layer (PHY) Specifications, Amendment 3: Enhancements for Very High Throughput in the 60 GHz Band, Dec. 28, 2012.

IEEE 802.11-16/1482r1, "Carrier Sense for Multi-Channel Allocation", Nov. 9, 2016.

The Extended European Search Report dated Apr. 7, 2020 for the related European Patent Application No. 18818375.0.

The 802 11 Working Group of the LAN/MAN Standards Committee of the IEEE Computer Society: IEEE Draft; Draft P802.11AY_D0.35, IEEE-SA, Piscataway, NJ USA, vol. 802.11ay drafts, No. D0.35, May 26, 2017 (May 26, 2017), pp. 1-256, XP068137602, Retrieved from the Internet: URL:www.ieee802.org/11/private/Draft_Standards/11ay/Draft P802.11ay_D0.35.pdf [retrieved on May 26, 2017].

Gaius Wee (Panasonic): "Unsolicited RSS After BTI", IEEE Draft; 11-17-1584-00-00AY-UNSOLICITED-RSS-AFTER-BTI, IEEE-SA Mentor, Piscataway, NJ USA, vol. 802.11ay, Oct. 17, 2017 (Oct. 17, 2017), pp. 1-5, XP068122236, Retrieved from the Internet: URL:https://mentor.ieee.org/802.11/dcn/17/11-17-1584-00-00ay-unsolicited-rss-after-bti.docx, [retrieved on Oct. 17, 2017].

English Translation of Russian Office Action dated Apr. 30, 2021 for the related Russian Application No. 2019141077, 6 pages.

English Translation of Taiwan Search Report dated Nov. 1, 2021 for related Taiwan Patent Application No. 107117583.

English Translation of Chinese Search Report dated Oct. 9, 2021 for the related Chinese Patent Application No. 201880030061.9, 3 pages.

English Translation of Colombia Office Action dated Jan. 18, 2022 for related Colombia Patent Application No. NC2019/0013646,19 pages.

Indian Examination Report dated Feb. 7, 2022 for related Indian Patent Application No. 201947050355, 6 pages.

* cited by examiner

FIG. 15

| Direction | CDOWN | Sector ID | DMG Antenna ID | Quasi-omni TX | PCP/AP Coverage Parameter | Unsolicited RSS Enabled | Reserved |
|---|---|---|---|---|---|---|---|
| 1 | 9 | 6 | 2 | 1 | 3 | 1 | 1 |

F4

Bits:

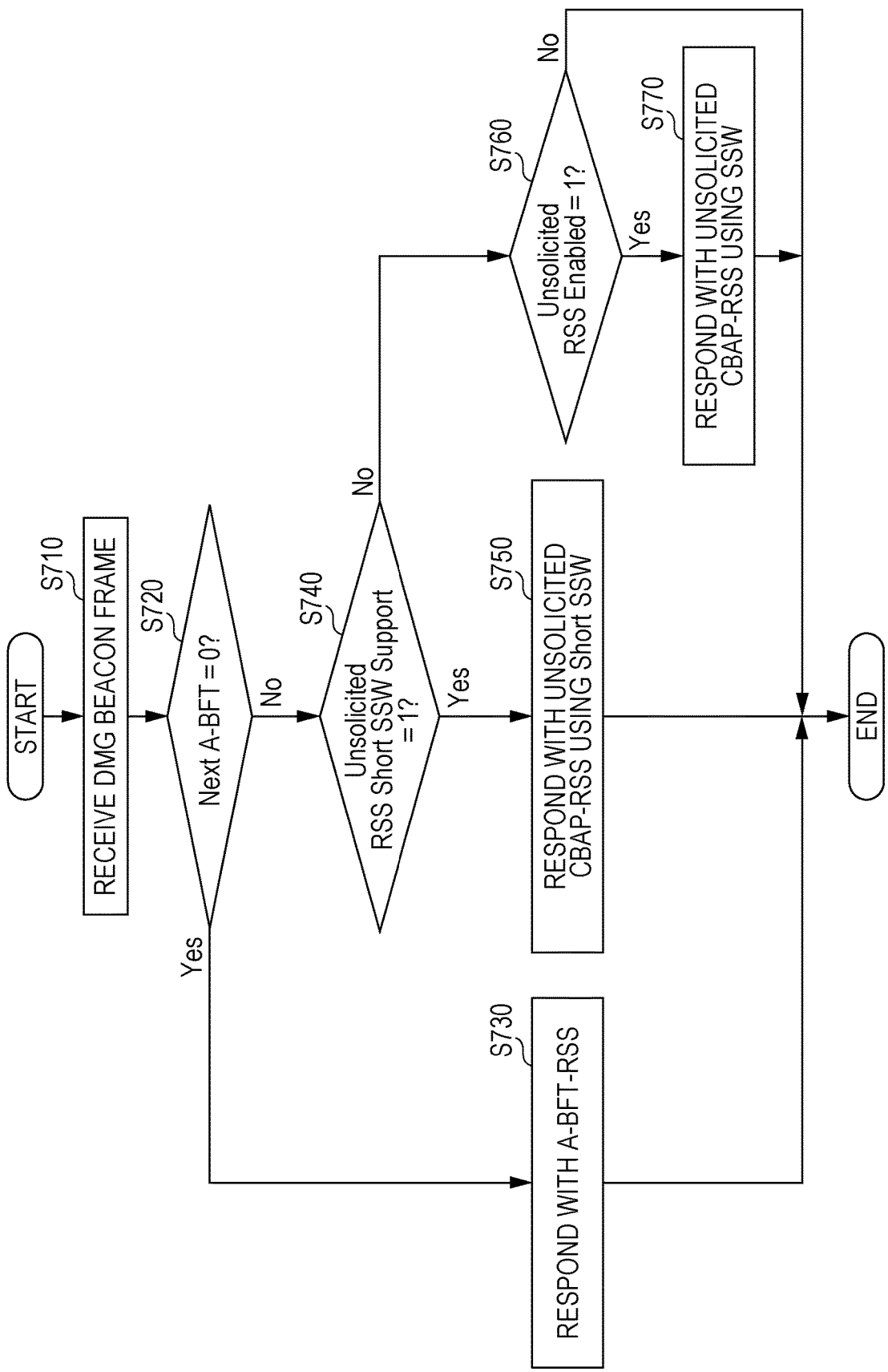

| Packet Type | Direction | Format Type | Source AID | Destination AID | CDOWN | Sector Select | DMG Antenna Select | Short Scrambled BSSID | Unassociated | FCS |
|---|---|---|---|---|---|---|---|---|---|---|
| 2 | 1 | 1 | 8 | 8 | 5 | 6 | 2 | 10 | 1 | 4 |

Bits:

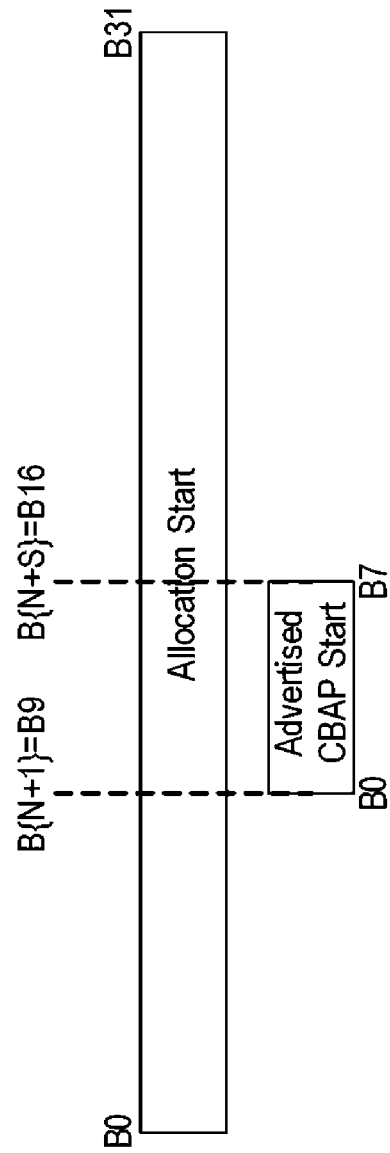

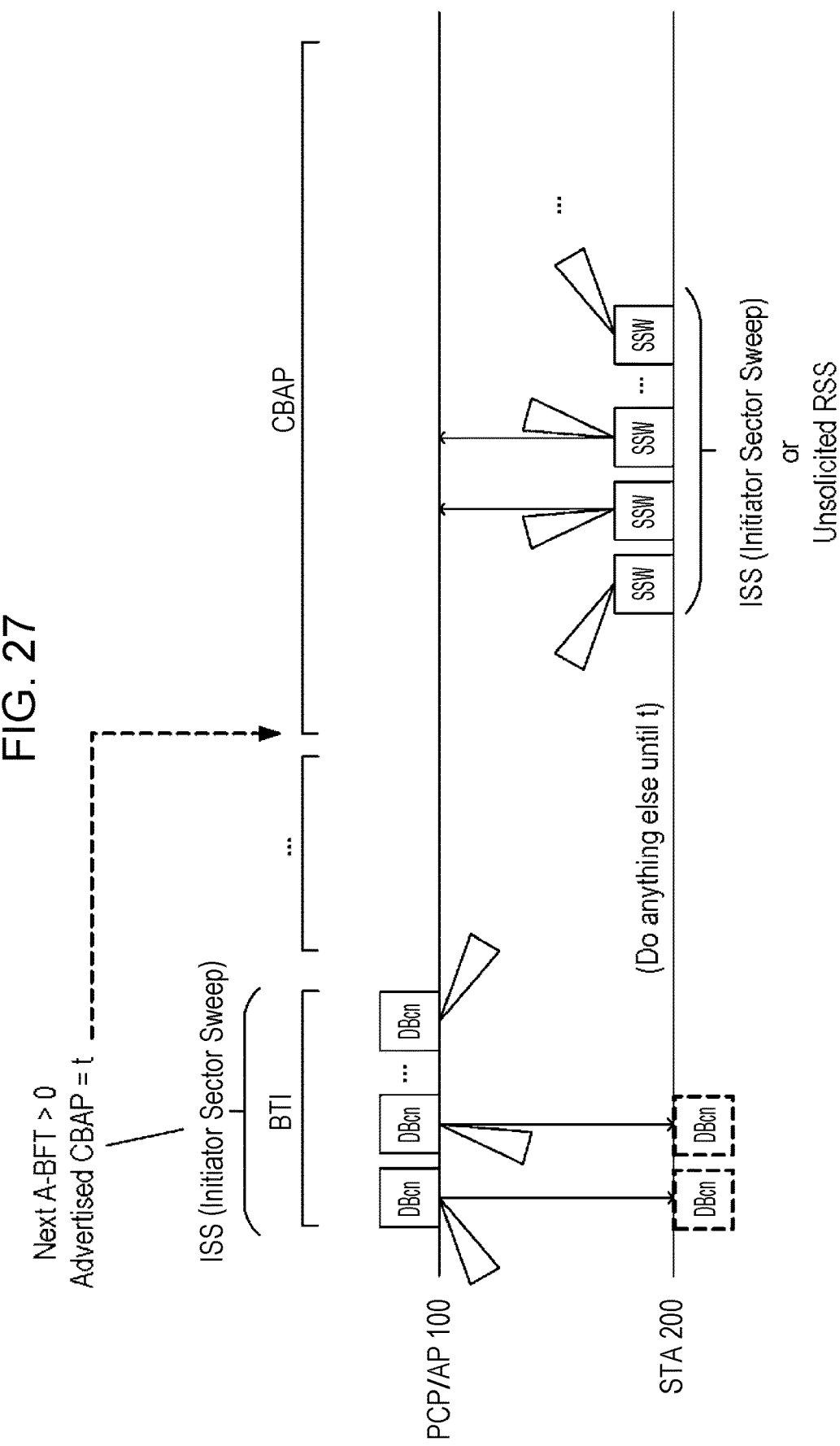

WIRELESS COMMUNICATION APPARATUS AND WIRELESS COMMUNICATION METHOD

CROSS-REFERENCE TO RELATED APPLICATIONS

This application is a U.S. national stage application of the PCT International Application No. PCT/JP2018/019003 filed on May 17, 2018, which claims the benefit of U.S. provisional application No. 62/521,107 filed on Jun. 16, 2017 and which claims the benefit of foreign priority of Japanese patent application 2018-086877 filed on Apr. 27, 2018, the contents all of which are incorporated herein by reference.

TECHNICAL FIELD

The present disclosure relates to a wireless communication apparatus and a wireless communication method.

BACKGROUND ART

IEEE 802.11 is one of the standards that relate to wireless LANs (Local Area Networks), and includes the IEEE 802.11ad standard and the IEEE 802.11ay standard, for example (see NPL 1 and 2, for example).

It should be noted that "IEEE" is an abbreviation for the "Institute of Electrical and Electronics Engineers". Furthermore, hereinafter, the "IEEE 802.11ad standard" is abbreviated as the "11ad standard" and the "IEEE 802.11ay standard" is abbreviated as the "11ay standard".

CITATION LIST

Non Patent Literature

NPL 1: IEEE 802.11ad-2012 published on Dec. 28, 2012
NPL 2: IEEE 802.11-16/1482r01 Carrier Sense for Multi-Channel Allocation, [online], November 2016, [retrieved Nov. 17, 2017], Internet <URL: https://mentor.ieee.org/802.11/dcn/16/11-16-1482-01-00ay-carrier-sense-for-multi-channel-allocation.pptx>

SUMMARY OF INVENTION

Technical Problem

A procedure in which a terminal (STA: Station) discovers other STAs in order to implement an initial connection with another STA is referred to as discovery. As an application using 60-GHz millimeter wave communication (short-range communication), high-speed discovery of 100 ms or less is being considered in order to realize high-speed connections which are required in, for example, automatic ticket gates for which a high-speed connection is required, data downloads in data kiosks, and backup wireless channels that substitute and/or complement wired networks in data centers.

In the discovery, a STA uses an SLS (Sector Level Sweep) sequence in order to identify an appropriate transmission sector and reception sector for the initial communication. As SLS sequences, for example, there have been proposals for an SLS sequence in an A-BFT (Association-Beam Forming Training) period which is a slotted access period, and an SLS sequence that uses a CBAP-ISS (Contention Based Access Period-Initiator Sector Sweep) in a CBAP which is an unslotted contention access period.

However, these SLS sequences take time to execute and there is an increase in the time to the completion of discovery.

A non-limiting example of the present disclosure contributes to providing an improved wireless communication apparatus and wireless communication method with which discovery is completed quickly.

Solution to Problem

A wireless communication apparatus according to an aspect of the present disclosure adopts a configuration provided with: a transmission wireless circuit that transmits a first sector sweep; a reception wireless circuit that receives a second sector sweep; and a control circuit that generates a beacon frame included in the first sector sweep, in which, in a case where the second sector sweep received within an unslotted contention access period by the reception wireless circuit is not a sector sweep in response to the first sector sweep, the control circuit includes, in the beacon frame, a first value indicating whether or not the transmission wireless circuit transmits feedback for the second sector sweep.

Furthermore, a wireless communication method according to an aspect of the present disclosure adopts a configuration in which: in a case where a second sector sweep received within an unslotted contention access period by a reception wireless circuit is not a sector sweep in response to a first sector sweep including a beacon frame, a first value indicating whether or not a transmission wireless circuit transmits feedback for the second sector sweep is included in the beacon frame; and the first sector sweep is transmitted.

It should be noted that general or specific aspects hereof may be realized by a system, a method, an integrated circuit, a computer program, or a recording medium, and may be realized by an arbitrary combination of a system, a device, a method, an integrated circuit, a computer program, and a recording medium.

Advantageous Effects of Invention

According to an aspect of the present disclosure, a terminal that has received a beacon frame from a wireless communication apparatus is able to start an SLS sequence that uses an unsolicited RSS, and therefore discovery can be completely quickly compared to when an SLS sequence that uses a CBAP-ISS is used.

Additional benefits and advantages in an aspect of the present disclosure will be made apparent from the specification and figures. The benefits and/or advantages may each be provided by several of the embodiments and the features disclosed in the specification and figures, and need not all be provided in order to obtain one or more of the same features.

BRIEF DESCRIPTION OF DRAWINGS

FIG. 15 is a drawing depicting an example of a format (format C) used for a Sector Sweep field F4 according to embodiment 2.

FIG. 22 is a flowchart depicting the operation of a STA according to embodiment 4.

FIG. 23B is a drawing depicting an example of a format (Format Type 1) of a short SSW packet transmitted in an unsolicited CBAP-RSS.

FIG. 26 is a drawing describing a value included in an Advertised CBAP Start field according to embodiment 5.

FIG. 27 is a drawing depicting an example of an SLS sequence in discovery according to embodiment 5.

DESCRIPTION OF EMBODIMENTS

Hereinafter, embodiments of the present invention will be described in detail with reference to the drawings as appropriate. However, detailed descriptions may be omitted from the above as necessary. For example, detailed descriptions of matters that are already well known and redundant descriptions of substantially identical configurations may be omitted. This is to avoid the following description becoming unnecessarily verbose and to facilitate the understanding of persons skilled in the art.

It should be noted that the appended drawings and the following description are provided in order for persons skilled in the art to sufficiently understand the present disclosure, not with the intention of thereby restricting the subject described in the claims.

SLS Sequence

A DMG (Directional Multi-Gigabit) STA executes discovery using an SLS sequence in order to identify an appropriate transmission sector and reception sector for an initial communication. An SLS sequence includes an ISS, an RSS (Responder Sector Sweep), an SSW-FB (SSW-FeedBack), and an SSW-ACK.

Figure 1:
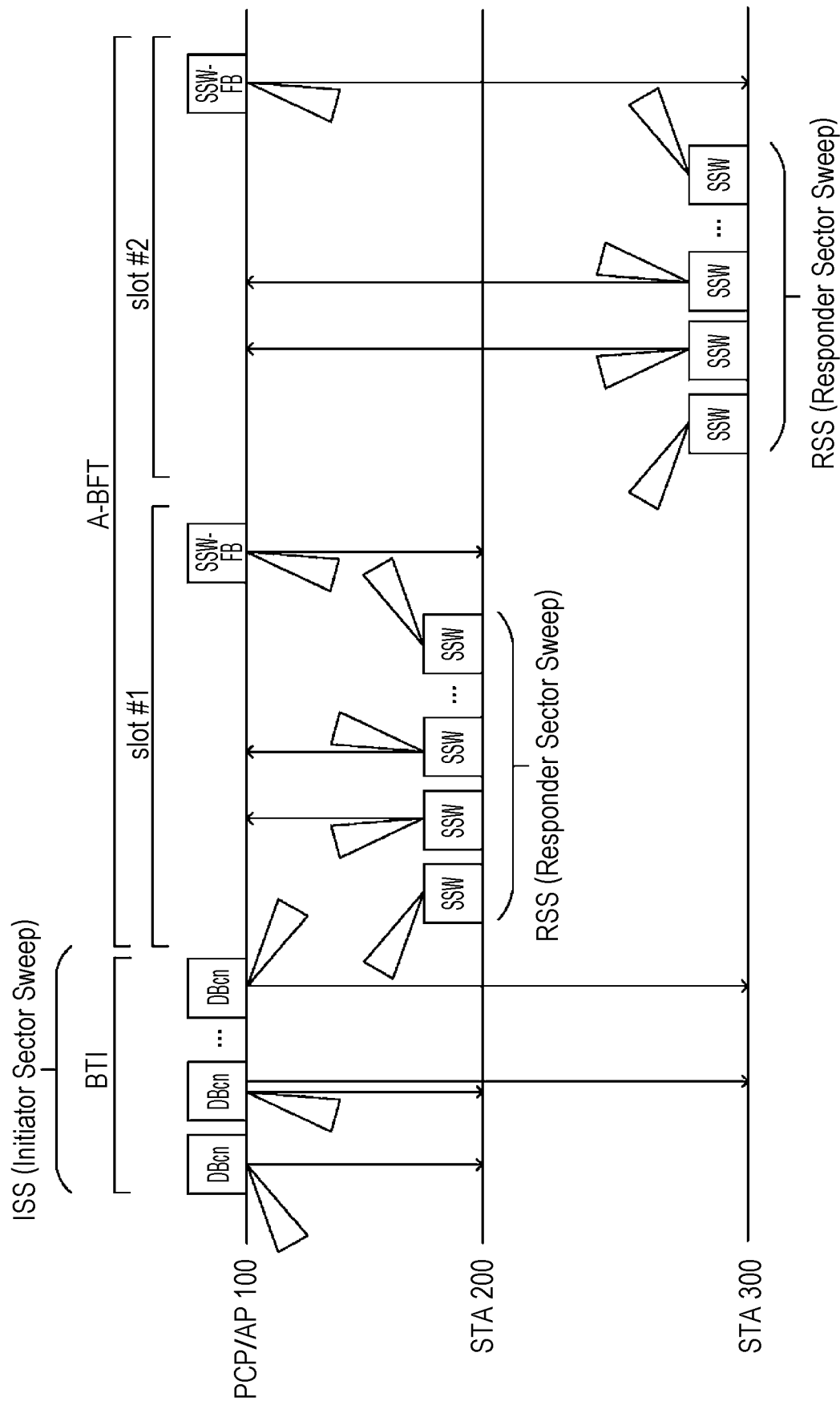
FIG. 1 is a drawing depicting an example of an SLS sequence that uses an A-BFT-RSS.

FIG. 1 is a drawing depicting an example of an SLS sequence that uses an A-BFT-RSS. In the example depicted in FIG. 1, an A-BFT period comes after a BTI (Beacon Transmission Interval). Here, the A-BFT period is a period in which A-BFT is carried out. A PCP/AP (PBSS (Personal Basic Service Set) Control Point or Access Point) 100 enables slotted access for a STA 200 and a STA 300 in slot #1 and slot #2, respectively, included in the A-BFT period.

As depicted in FIG. 1, the PCP/AP 100, in the BTI, transmits DMG beacon frames (DBcn) to the STA 200 and the STA 300 and carries out a BTI-ISS. The BTI-ISS, for example, is configured from a maximum of 64 DBcn frames, and each DBcn frame includes an SSW (Sector SWeep) field.

The STA 200 having received the DMG beacon frames DBcn responds with an RSS (Responder Sector Sweep) (A-BFT-RSS) within the A-BFT period, in slot #1 in which slotted access is enabled. The A-BFT-RSS, for example, includes a maximum of 16 SSW frames or 25 short SSW packets. The PCP/AP 100 having received the A-BFT-RSS responds with an SSW-FB (FeedBack) in slot #1, and completes discovery.

Similarly, the STA 300 having received the DMG beacon frames DBcn responds with an RSS (A-BFT-RSS) within the A-BFT period, in slot #2 in which slotted access is enabled. The PCP/AP 100 having received the A-BFT-RSS responds with an SSW-FB in slot #2, and completes discovery. In other words, A-BFT supports RSSs through slotted access.

Figure 2:
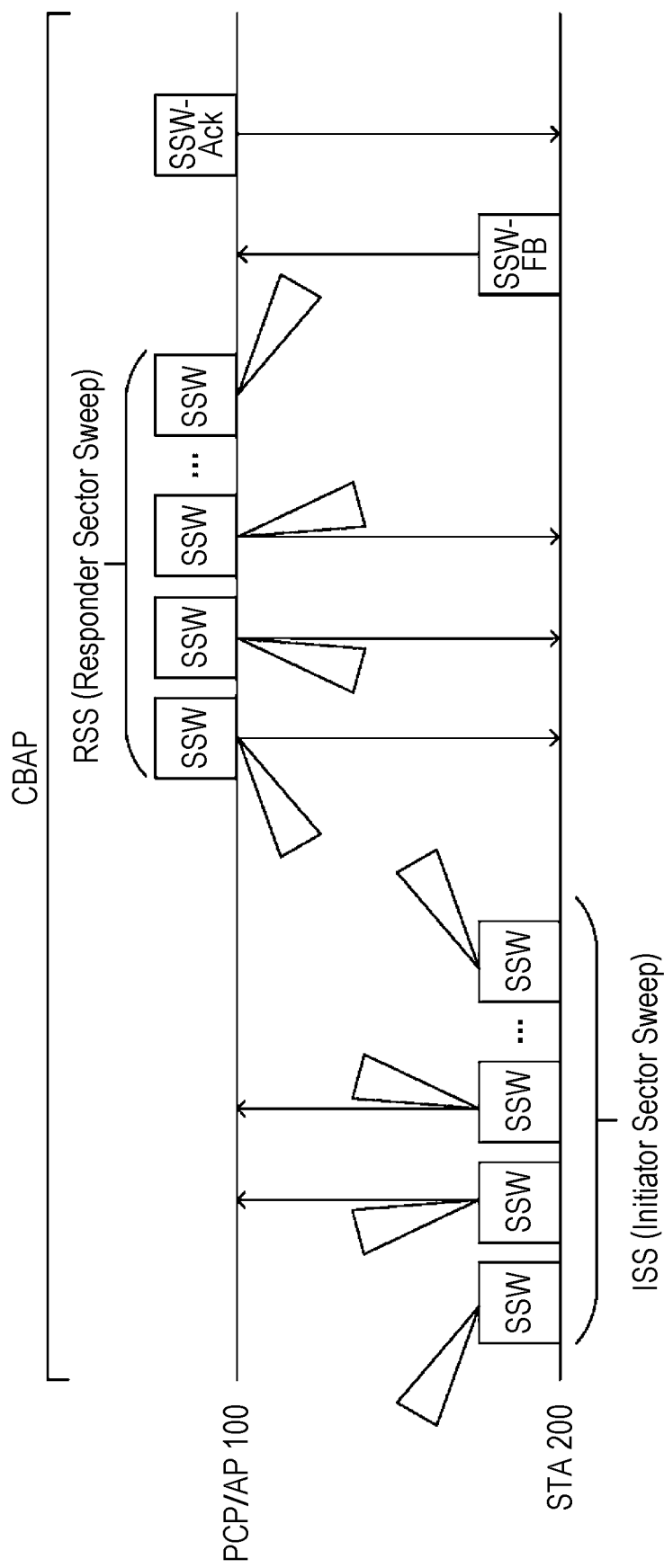
FIG. 2 is a drawing depicting an example of an SLS sequence that uses a CBAP-RSS.

FIG. 2 is a drawing depicting an example of an SLS sequence that uses a CBAP-RSS. As depicted in FIG. 2, the STA 200 carries out a CBAP-ISS toward the PCP/AP 100 in a CBAP. The CBAP-ISS, for example, includes a maximum of 512 SSW frames or a maximum of 2048 short SSW packets.

The PCP/AP 100 having received the CBAP-ISS responds with an RSS (CBAP-RSS) within the CBAP. In other words, the CBAP supports RSSs through unslotted access. The CBAP-RSS, for example, includes a maximum of 512 SSW frames or a maximum of 2048 short SSW packets.

The STA 200 having received the CBAP-RSS responds with an SSW-FB (FeedBack) in the CBAP. The PCP/AP 100 having received the SSW-FB responds with an SSW-ACK in the CBAP, and completes discovery.

The STA 200 that executes discovery with respect to the PCP/AP 100 receives DMG beacon frames within a BTI-ISS (not depicted) before executing an SLS sequence. The STA 200 having received the DMG beacon frames refers to the DMG beacon frames to determine whether or not an A-BFT period is present in a BI (Beacon Interval). The STA 200 may execute the BTI-RSS of FIG. 1 in a case where an A-BFT period is present in the BI, and may execute the CBAP-ISS of FIG. 2 in a case where an A-BFT period is not present in the BI.

Figure 3:
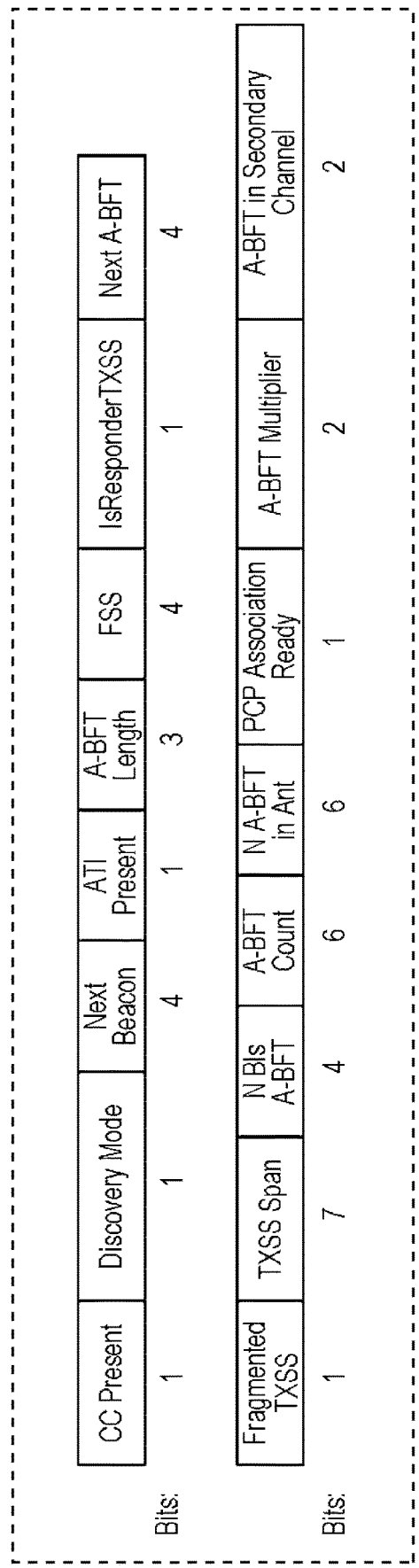
FIG. 3 is a drawing depicting an example of the format of a DMG beacon frame.

FIG. 3 is a drawing depicting an example of the format of a Beacon Interval Control field, which is included in the DMG beacon frames. The presence of A-BFT is signaled using a Next A-BFT (the next A-BFT) sub-field composed of four bits in the Beacon Interval Control field of the DMG beacon frames depicted in FIG. 3. The value of the Next A-BFT sub-field is decremented by 1 for every BI, and, when 0, indicates that an A-BFT period is present. The Next A-BFT sub-field can be reset to an arbitrary value (0 to 15) in the next BI. [0027]

If an A-BFT period is present in the BI, the STA 200 executes discovery by means of an SLS sequence that uses an A-BFT-RSS. As mentioned above with reference to FIG. 2, an A-BFT-RSS and an SSW-FB are exchanged using a dedicated slot, and therefore an SLS sequence is completed in the dedicated slot period. Consequently, discovery is also completed in the dedicated slot period.

Meanwhile, in a case where an A-BFT period is not present in the BI, the STA 200, in order to execute discovery, executes according to an SLS sequence that uses a CBAP-ISS, or waits until the next BI in which an A-BFT period is present (hereinafter referred to as a full SLS sequence). As mentioned above with reference to FIG. 1, an SLS sequence that uses a CBAP-ISS is a full SLS sequence that includes a CBAP-ISS, a CBAP-RSS, an SSW-FB, and an SSW-ACK, and the time to completion is long compared to when using an SLS sequence that uses an A-BFT-RSS. Consequently, the time to discovery completion is also long.

In addition, a CBAP-ISS is based on unslotted contention access, and therefore the possibility of interference occurring increases when a full SLS sequence is executed in a CBAP, and the possibility of execution failing is higher than when an SLS sequence is executed in an A-BFT period.

Figure 4:
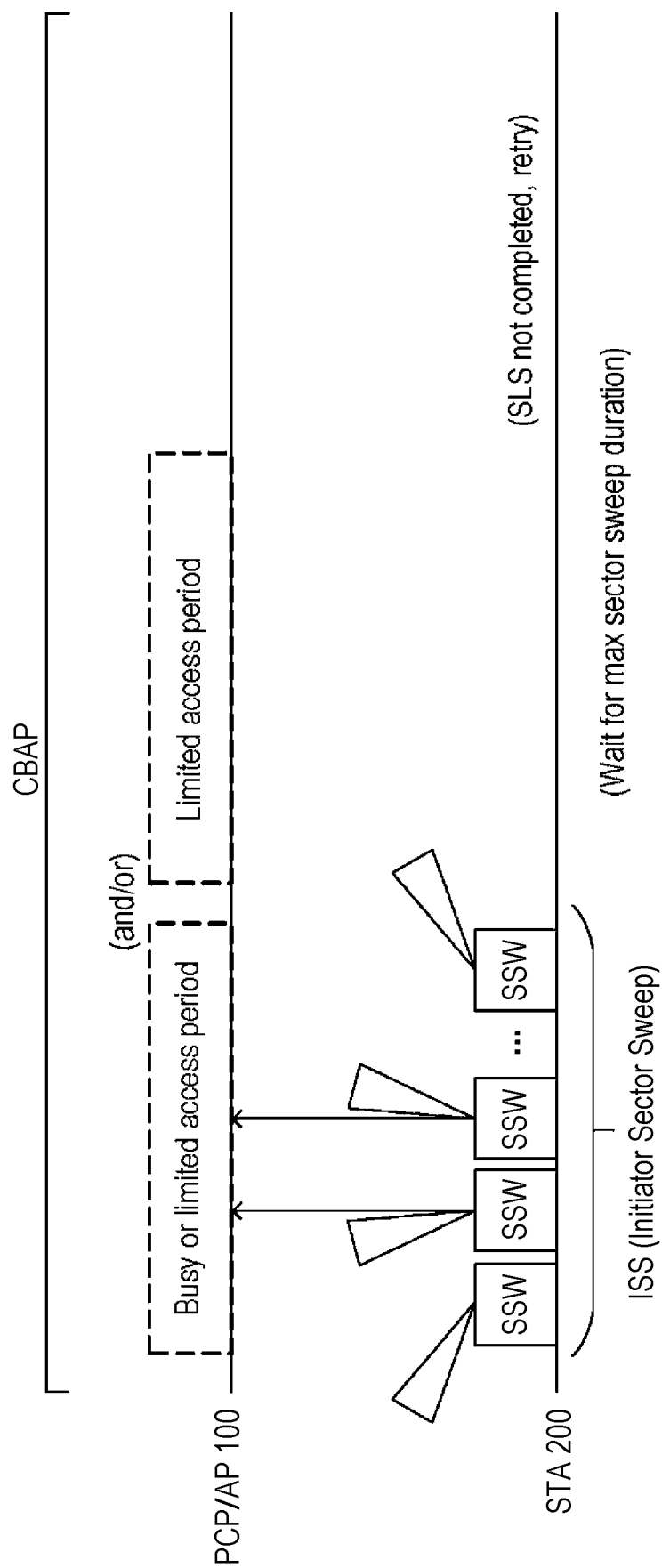
FIG. 4 is a drawing depicting an example of a CBAP.

FIG. 4 is a drawing depicting an example of a CBAP. As depicted in FIG. 4, the possibility of the execution of a full SLS sequence failing increases due to a CBAP-ISS carried out when the PCP/AP 100 is busy or within a limited access period. In a case where discovery fails and the STA 200 executes a full SLS sequence once again, there is a further increase in the time to discovery completing.

Furthermore, in a case where the STA 200 waits until the next BI in which an A-BFT period is present, the time to discovery completing increases by the amount of time spent waiting.

The present disclosure addresses these matters.

Embodiment 1

The PCP/AP 100 and the STA 200 according to embodiment 1 support unsolicited CBAP-RSSs.

Figure 5:
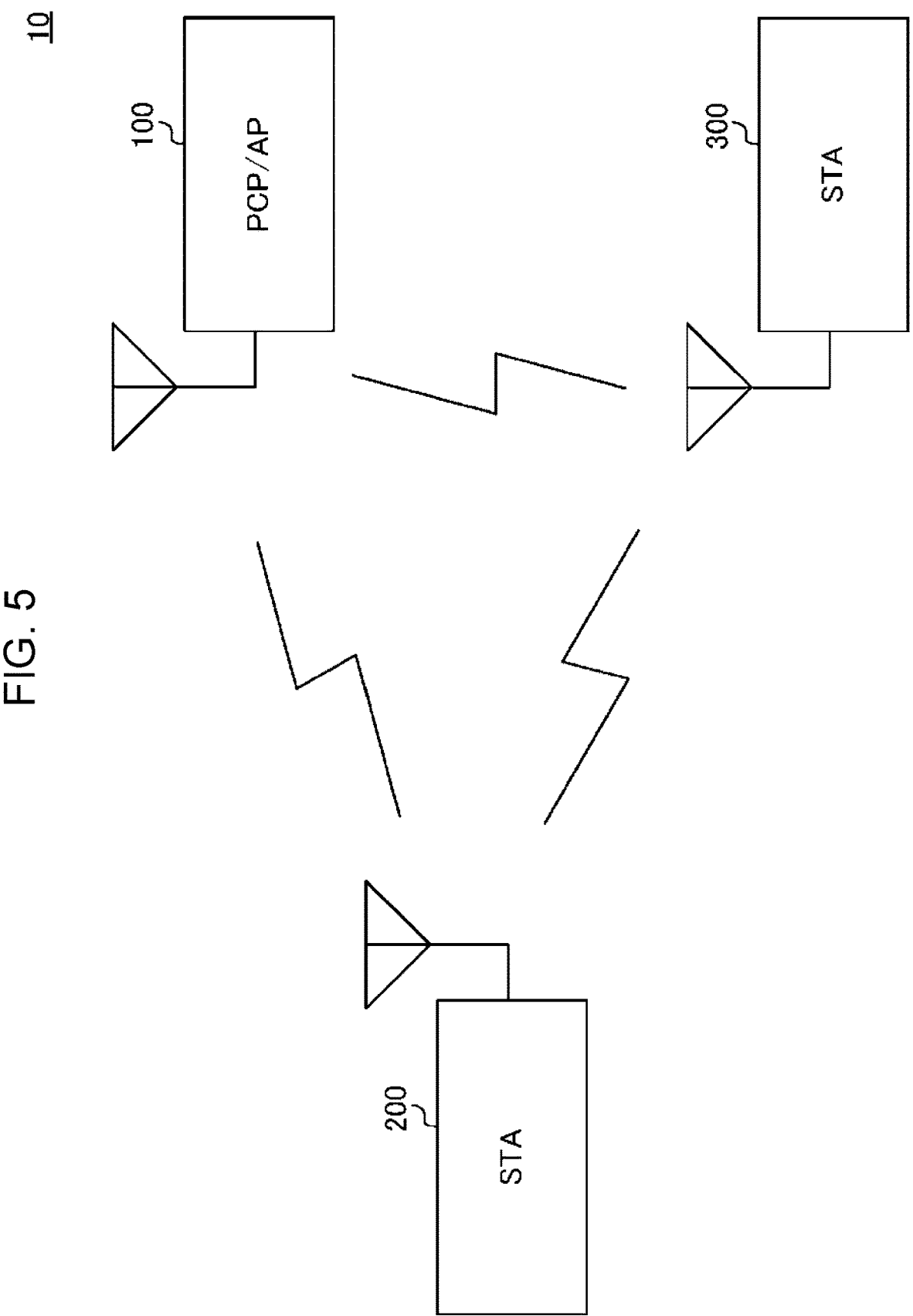
FIG. 5 is a drawing depicting an example of the configuration of the entirety of a system according to the present disclosure.

FIG. 5 is a drawing depicting an example of the configuration of the entirety of a system 10 according to the present disclosure. The system 10 includes the PCP/AP 100, the STA 200, and the STA 300. As depicted in FIG. 5, the PCP/AP 100 communicates with the STA 200 and the STA 300. Furthermore, another PCP/AP 400 (not depicted) may communicate with the STA 200 and the STA 300. In one example, the STA 200 and the STA 300 may communicate with each other.

Configuration Diagram

Figure 6:
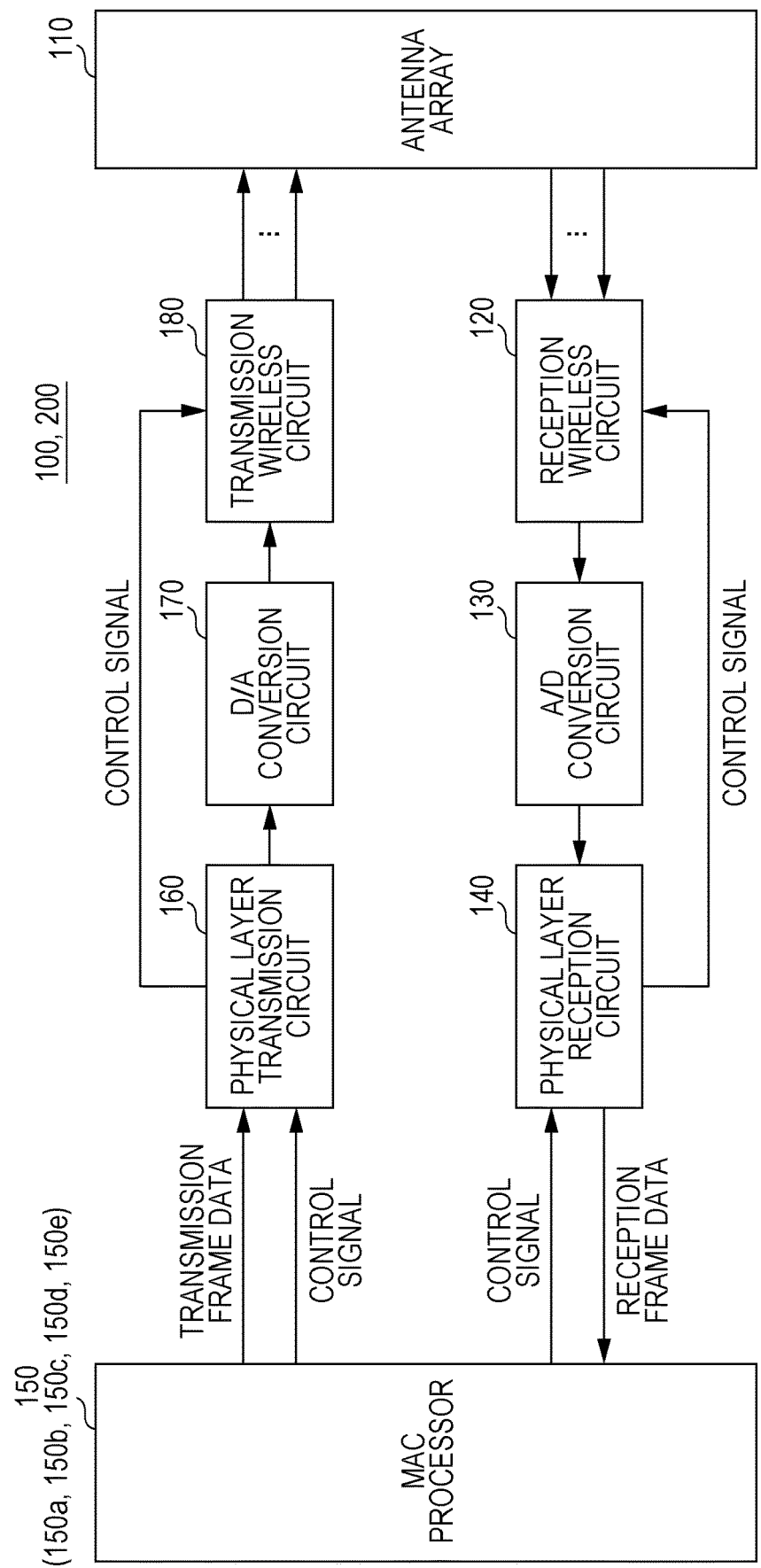
FIG. 6 is a drawing depicting an example of the configuration of a PCP/AP and a STA according to the present disclosure.

FIG. 6 is a drawing depicting an example of the configuration of the PCP/AP 100 and the STA 200 according to the present disclosure. The PCP/AP 100 and the STA 200 according to embodiment 1 are each provided with an antenna array 110, a reception wireless circuit 120, an A/D conversion circuit 130, a physical layer reception circuit 140, a MAC processor (control circuit) 150, a physical layer transmission circuit 160, a D/A conversion circuit 170, and a transmission wireless circuit 180. These constituent elements operate based on the PHY specification or the MAC specification of the 11ad standard and the 11ay standard.

The antenna array 110 transmits transmission wireless frequency signals and receives reception wireless frequency signals. The reception wireless circuit 120 converts a reception wireless frequency signal into a reception analog baseband signal. The A/D conversion circuit 130 converts the reception analog baseband signal into a reception digital baseband signal.

The physical layer reception circuit 140 uses the reception digital baseband signal to execute synchronization, equalization, demodulation, and decoding, for example, and generate reception frame data. In addition, the physical layer reception circuit 140 sends a portion of a control signal from the MAC processor 150 to the reception wireless circuit 120, and carries out the starting and stopping of reception and the control of reception sectors.

The MAC processor 150 processes MAC frames from the reception frame data, and generates MAC frames as transmission frame data in accordance with a MAC protocol. In addition, the MAC processor 150 sends control signals to the physical layer reception circuit 140 and the physical layer transmission circuit 160. The control signals include, for example, start and stop instructions for transmission and reception conforming to a BI schedule, information regarding the modulation scheme, coding rate, frame data length, and transmission frame data, and information regarding sector selection for the transmission wireless circuit 180 and the reception wireless circuit 120.

The MAC processor 150 of the PCP/AP 100 generates DMG beacon frames that include the Next A-BFT sub-field having a value that is set to a value greater than 0, and an Unsolicited RSS Enabled sub-field having a value that is set to 0 or 1, in a beacon transmission interval (BTI).

The MAC processor 150 of the STA 200 processes DMG beacon frames that include an Unsolicited RSS Enabled sub-field having a value that is set to 1, in the BTI. Next, in a case where an A-BFT period is included in the BI, the MAC processor 150 generates SSW frames that include a Direction field having a value that is set to 1, and feedback that is based on a BTI-ISS (Initiator Sector Sweep), within the A-BFT period or within a DTI.

The physical layer transmission circuit 160, for example, uses transmission frame data to execute encoding, modulation, frame construction, and filtering and generate a transmission digital baseband signal. In addition, the physical layer transmission circuit 160 sends a portion of a control signal from the MAC processor 150 to the transmission wireless circuit 180, and carries out the starting and stopping of transmission and the control of transmission sectors.

The D/A conversion circuit 170 converts the transmission digital baseband signal into a transmission analog baseband signal. The transmission wireless circuit 180 converts the transmission analog baseband signal into a transmission wireless frequency signal.

Figure 7:
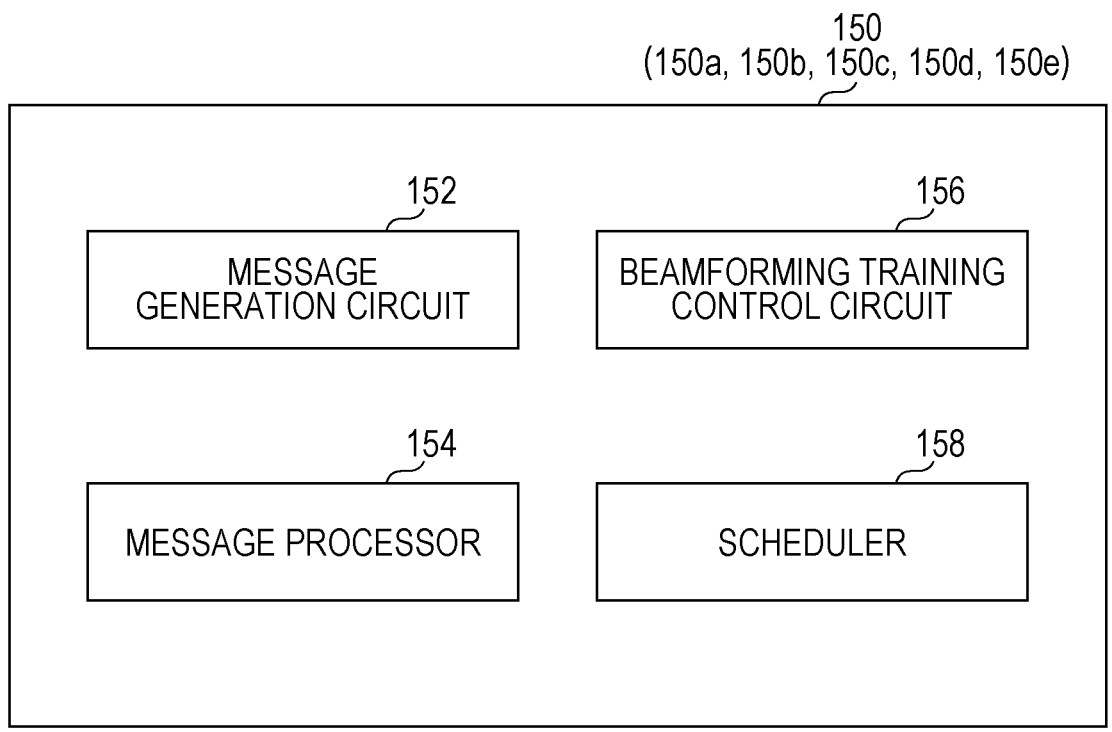
FIG. 7 is a drawing depicting an example of a MAC processor according to the present disclosure.

FIG. 7 is a drawing depicting an example of the MAC processor 150 according to the present disclosure. The MAC processor 150 includes a message generation circuit 152, a message processor 154, a beamforming training control circuit 156, and a scheduler 158.

The message generation circuit 152 generates MAC frames (for example, DMG beacon frames, SSW frames, or the like) that are transmitted to the PCP/AP 100 or the STA 200.

The message processor 154 identifies MAC frames received from the PCP/AP 100 or the STA 200, and processes the MAC frames in accordance with the identification result.

During beamforming training, the beamforming training control circuit 156 controls the message generation circuit 152, the message processor 154, the reception wireless circuit 120, and the transmission wireless circuit 180 with regard to the transmission and reception of DMG beacon frames, SSW frames, SSW Feedback frames, and SSW-Ack frames within SLS sequences.

The scheduler 158 implements a BI schedule including a BTI, an A-BFT period, and a CBAP. The details of the content of the BI schedule will be described later.

Operation of PCP/AP 100

The STA 200 that executes discovery with respect to the PCP/AP 100, for example, receives DMG beacon frames DBcn within a BTI-ISS before executing an SLS sequence, as in FIG. 1. The PCP/AP 100, for example, changes the transmission sector for every DMG beacon frame DBcn by carrying out a BTI-ISS every fixed period. The generation of DMG beacon frames DBcn transmitted by the PCP/AP 100 and the operation of the MAC processor 150 of the PCP/AP 100 will be described hereinafter.

Figure 8:
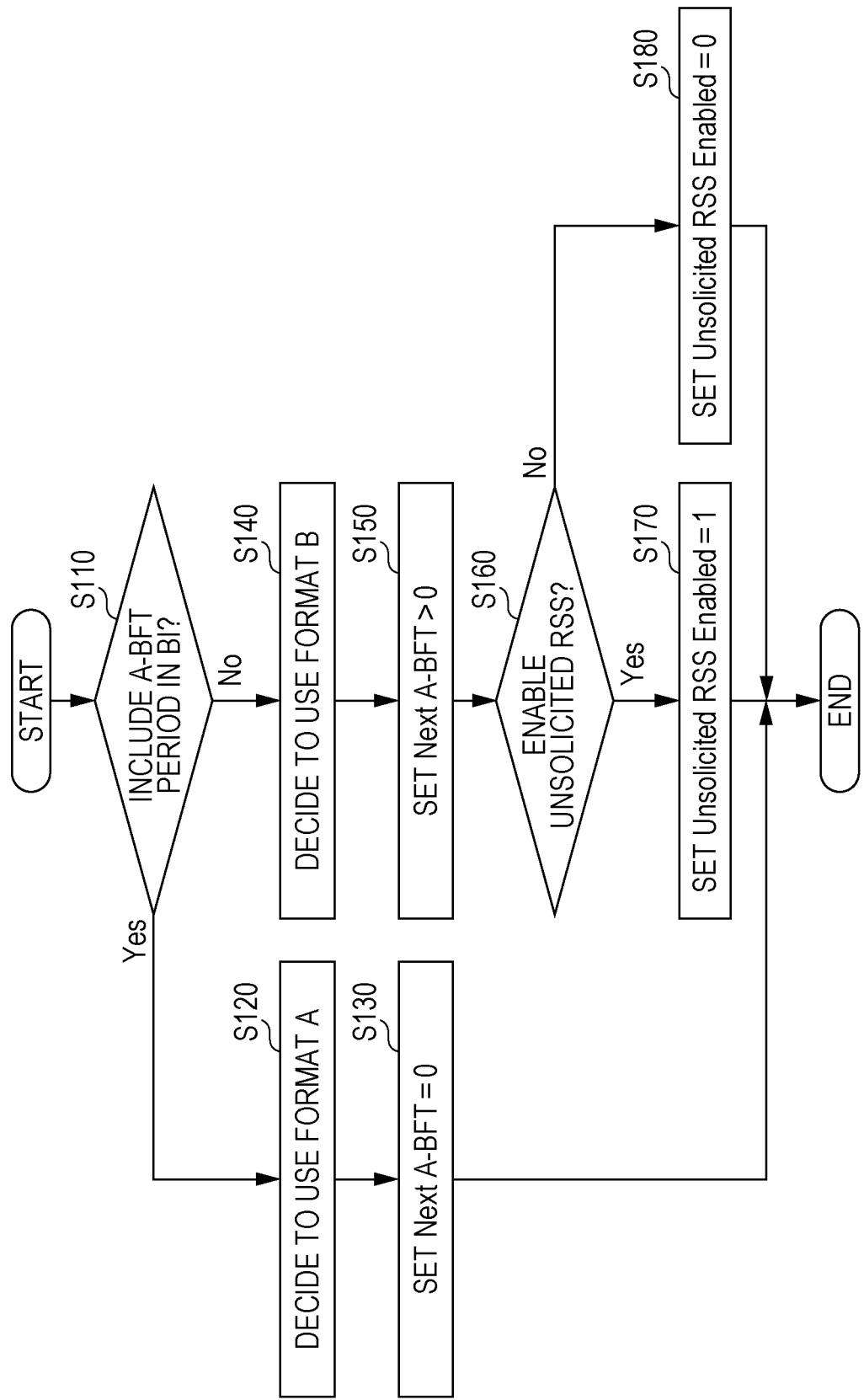
FIG. 8 is a flowchart depicting the operation of a MAC processor of a PCP/AP according to embodiment 1.

FIG. 8 is a flowchart depicting the operation of the MAC processor 150 of the PCP/AP 100 according to embodiment 1.

In step S110, the MAC processor 150 of the PCP/AP 100 decides whether or not to include an A-BFT period in the BI.

For example, in a case where discovery is expected to be executed, there is a large number of STAs that execute discovery, or there is sufficient time allocated for data traffic in a DTI (Data Transmission Interval), the MAC processor 150 may decide to include an A-BFT period in the BI. In a case where an A-BFT period is included in the BI, slotted access is enabled, as in FIG. 1. By using slotted access, discovery can be carried out with little latency.

Furthermore, for example, in a case where discovery is not expected to be executed or there is only a small number of STAs that will execute discovery, the MAC processor 150 may decide to not include an A-BFT period in the BI so that slotted access is not enabled. By not using slotted access, it is possible to avoid generating A-BFT periods that are not fully utilized, and it is possible to improve BI efficiency.

In a case where an A-BFT period is included in the BI (step S110: yes), in step S120, the MAC processor 150 decides to use format A (described later) for a Beacon Interval Control field of the DMG beacon frames used to execute a BTI-ISS.

Figure 9A:
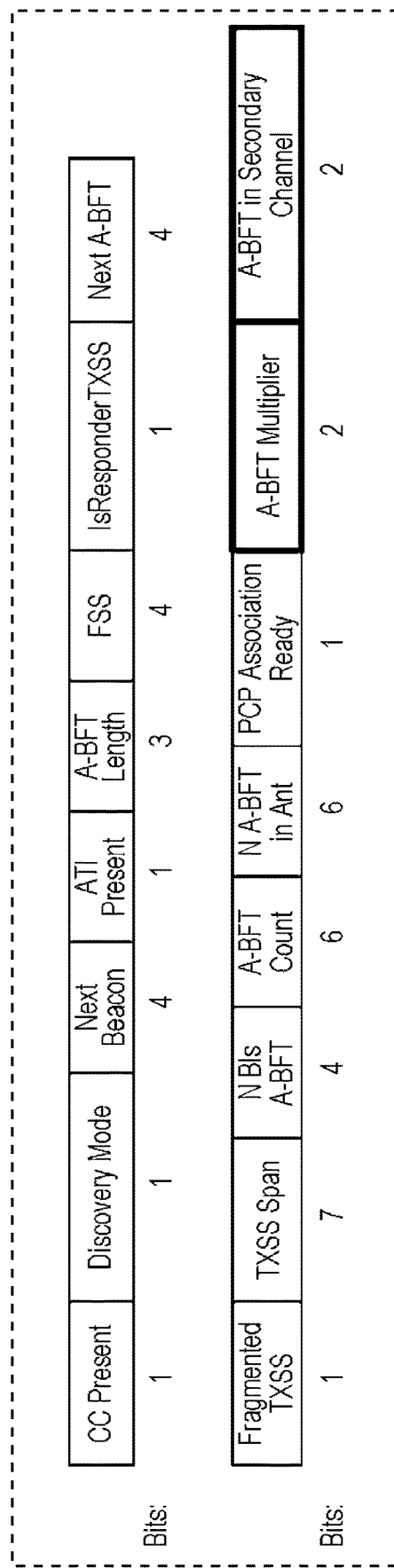
FIG. 9A is a drawing depicting an example of a format (format A) used for a Beacon Interval Control field according to embodiment 1.

FIG. 9A is a drawing depicting an example of a format (format A) used for a Beacon Interval Control field F1 according to embodiment 1. In a case where DMG beacon frames in which the value of the Next A-BFT sub-field of the Beacon Interval Control field F1 has been set to 0 are transmitted by the PCP/AP 100, the STA 200 having received the DMG beacon frames is able to recognize that an A-BFT period is included in the BI and the Beacon Interval Control field F1 is included in the DMG beacon frame. In a case where an A-BFT period is included in the BI, slotted access for executing an SLS sequence that uses A-BFT-RSS is enabled, as depicted in FIG. 1.

Reference will once again be made to FIG. 8. In step S130, the value of the Next A-BFT sub-field of the Beacon Interval Control field is set to 0.

Meanwhile, in a case where an A-BFT period is not included in the BI (step S110: no), in step S140, the MAC processor 150 decides to use format B (described later) for the Beacon Interval Control field of the DMG beacon frames used to execute a BTI-ISS.

Figure 9B:
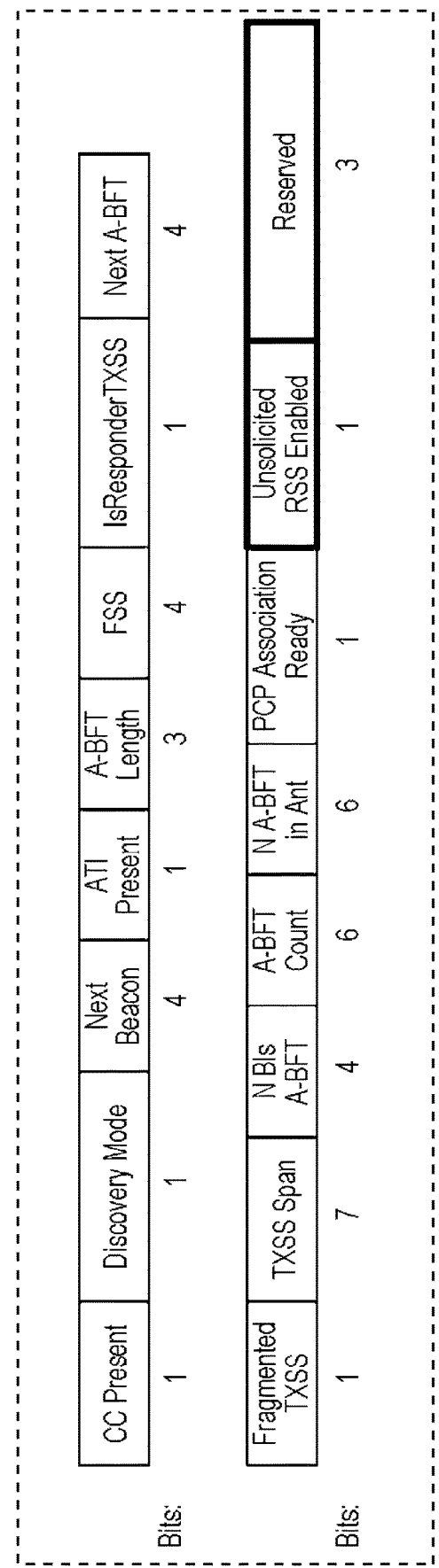
FIG. 9B is a drawing depicting another example of a format (format B) used for a Beacon Interval Control field according to embodiment 1.

FIG. 9B is a drawing depicting another example of a format (format B) used for a Beacon Interval Control field F2 according to embodiment 1. In a case where the PCP/AP 100 executes a BTI-ISS using DMG beacon frames in which the value of the Next A-BFT sub-field of the Beacon Interval Control field F2 has been set to a value greater than 0, the STA 200 having received the DMG beacon frames is able to recognize that an A-BFT period is not included in the BI and the Beacon Interval Control field F2 is included in the DMG beacon frame.

In a case where an A-BFT period is not included in the BI, parameters for A-BFT may be omitted. Consequently, in format B used in a case where an A-BFT period is not included in the BI, fields that store parameters relating to A-BFT may be omitted. Here, fields that store parameters relating to A-BFT are, for example, an A-BFT Multiplier sub-field and an A-BFT in Secondary Channel sub-field included in format A.

Thus, in format B, some or all fields that store parameters relating to A-BFT are used for an Unsolicited RSS Enabled sub-field for indicating support for responding to unsolicited RSSs within a CBAP. For example, in a case where it is indicated that responding to unsolicited RSSs within a CBAP is supported, the MAC processor 150 sets the value of the Unsolicited RSS Enabled sub-field to 1. Furthermore, for example, in a case where it is indicated that responding to unsolicited RSSs within a CBAP is not supported, the MAC processor 150 sets the value of the Unsolicited RSS Enabled sub-field to 0.

It should be noted that a field or sub-field used as the Unsolicited RSS Enabled sub-field may be any field or sub-field as long as it is a field that may be omitted in a case where an A-BFT period is not included in the BI. For example, an IsResponderTXSS sub-field may be used for the Unsolicited RSS Enabled sub-field instead of the aforementioned A-BFT Multiplier sub-field and the A-BFT in Secondary Channel sub-field.

It should be noted that, in format B, in a case where the value of the Next A-BFT sub-field has been set to a value greater than 0, a BTI-ISS is executed as frequently as necessary whereas A-BFT is executed less frequently, and it is therefore possible to permit the allocation of more time for data traffic.

Reference will once again be made to FIG. 8. In step S150, the value of the Next A-BFT sub-field of the Beacon Interval Control field is set to a value greater than 0.

In step S160, the MAC processor 150 decides whether or not to enable unsolicited RSSs.

For example, in a case where it is expected that the PCP/AP 100 will not use an RSS in the BI, such as when there is no broadcast CBAP that can be used, the MAC processor 150 may decide not to enable unsolicited RSSs. By not enabling unsolicited RSSs, the PCP/AP 100 is able to indicate that the STA 200 is to wait until another BI in which an A-BFT period is included in the BI or unsolicited RSSs are enabled.

Furthermore, for example, in a case where the number of connections or BSS performance of the PCP/AP 100 reaches a threshold value, the MAC processor 150 may decide not to enable unsolicited RSSs. By not enabling unsolicited RSSs, the PCP/AP 100 is able to prompt the STA 200 to participate in another BSS (Basic Service Set). It should be noted that the MAC processor 150 may decide to enable unsolicited RSSs in cases other than the aforementioned.

In a case where unsolicited RSSs are enabled (step S160: yes), in step S170, the MAC processor 150 sets the value of the Unsolicited RSS Enabled sub-field to 1. Meanwhile, in a case where unsolicited RSSs are not enabled (step S160: no), in step S180, the MAC processor 150 sets the value of the Unsolicited RSS Enabled sub-field to 0.

The processing flow ends once step S130, S170, or S180 has been executed.

Operation of STA 200

Next, a description will be given regarding the content of processing for RSS execution by the STA 200 having received DMG beacon frames DBcn generated according to the flowchart depicted in FIG. 8.

Figure 10:
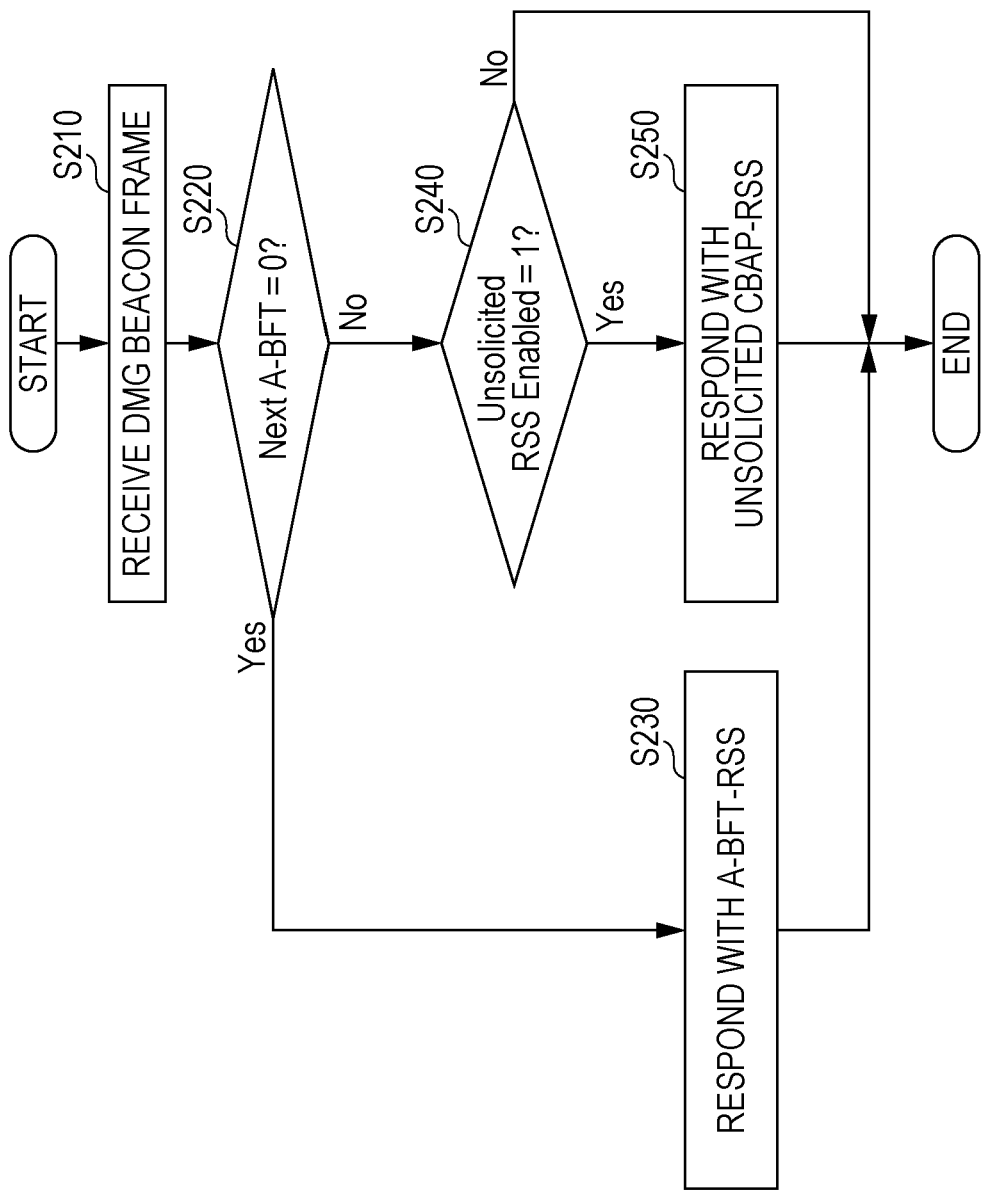
FIG. 10 is a flowchart depicting the operation of a STA according to embodiment 1.

FIG. 10 is a flowchart depicting the operation of the STA 200 according to embodiment 1. In step S210, the STA 200 receives the DMG beacon frames DBcn transmitted by the PCP/AP 100, which is indicated in the BTI in FIGS. 1 and 12, for example.

In step S220, the STA 200 determines whether or not the value of the Next A-BFT sub-field of the DMG beacon frames DBcn is 0.

In a case where the value of the Next A-BFT sub-field is 0 (step S220: yes), in step S230, the STA 200 responds with an A-BFT-RSS, and the flow ends. For example, the STA 200 executes an SLS sequence that uses the A-BFT-RSS mentioned above with reference to FIG. 1.

Meanwhile, in a case where the value of the Next A-BFT sub-field is not 0 (step S220: no), in step S240, the STA 200 determines whether or not the value of the Unsolicited RSS Enabled sub-field of the DMG beacon frames DBcn is 1.

In a case where the value of the Unsolicited RSS Enabled sub-field is 1 (step S240: yes), in step S250, the STA 200 responds with an unsolicited CBAP-RSS, and the flow ends. The operation of responding with an unsolicited CBAP-RSS will be described hereinafter.

Figure 11:
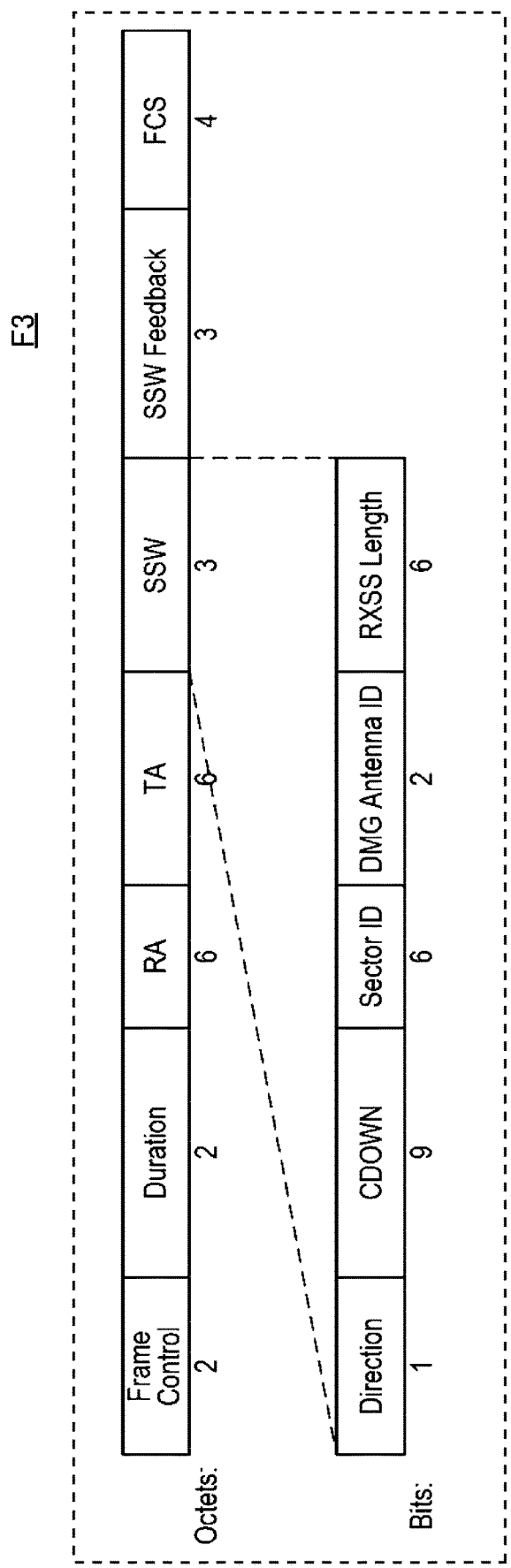
FIG. 11 is a drawing depicting an example of the format of an SSW frame transmitted in an unsolicited CBAP-RSS.

FIG. 11 is a drawing depicting an example of the format of an SSW frame F3 transmitted in an unsolicited CBAP-RSS. In the case of an unsolicited CBAP-RSS, the value of a Direction sub-field of the SSW frame F3 is set to 1. By setting the value of the Direction sub-field to 1, it is indicated that the SSW frame F3 has been transmitted by a responder such as the STA 200 of FIG. 12, and is namely an RSS.

Furthermore, the SSW frame F3 includes ISS feedback that is based on the BTI-ISS received by the STA 200. In one example, the SSW frame F3 may include a Response to BTI sub-field having a value to set to 1, in order to indicate being an unsolicited RSS that is based on a BTI.

Reference will once again be made to FIG. 10. In a case where the value of the Unsolicited RSS Enabled sub-field is not 1 (step S240: no), the flow ends. It should be noted that the STA 200 may wait until the next BI, return to the start of FIG. 10, and repeat the processing. It should be noted that the STA 200 determines that discovery has failed in a case where the SLS sequence is not completed within a predetermined time.

Discovery

The SLS sequence in discovery according to embodiment 1 in which the Beacon Period Control fields F1 and F2 and the SSW frame F3 are used, mentioned above with reference to FIGS. 9A, 9B, and 11, will be described hereinafter with reference to the flowcharts depicted in FIGS. 8 and 10.

Figure 12:
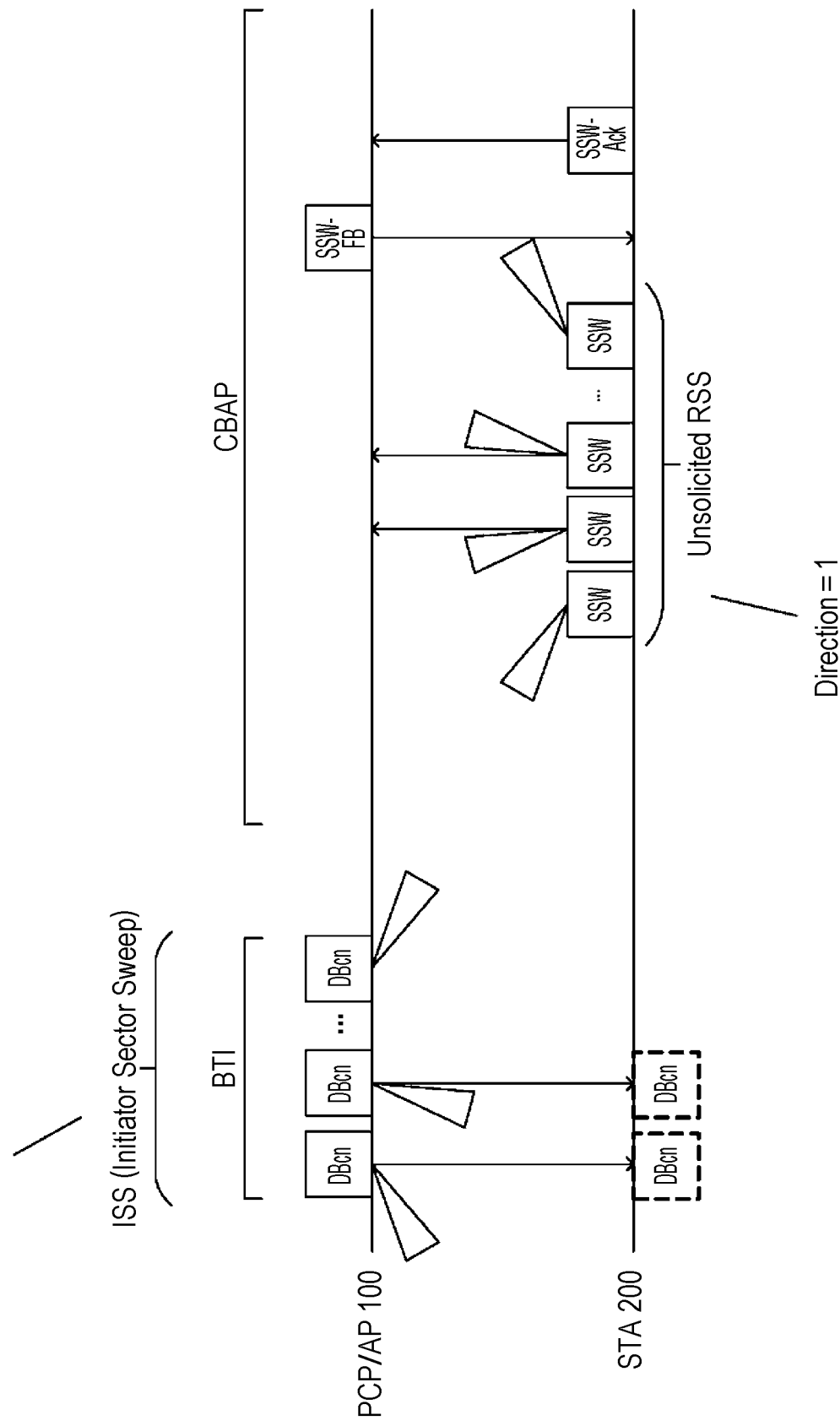
FIG. 12 is a drawing depicting an example of an SLS sequence in discovery according to embodiment 1.

FIG. 12 is a drawing depicting an example of an SLS sequence in discovery according to embodiment 1. The PCP/AP 100 transmits an ISS (BTI-ISS) in a BTI using DMG beacon frames DBcn generated by the MAC processor 150. For example, the MAC processor 150 generates DMG beacon frames DBcn by executing steps S140, S150, and S170 in FIG. 8. As depicted in FIG. 12, in the DMG beacon frames DBcn, the value of the Next A-BFT sub-field is greater than 0 and the value of the Unsolicited RSS Enabled sub-field is 1.

The STA 200 starts an RSS in response to receiving the BTI-ISS. As mentioned above, in the DMG beacon frames DBcn used in the BTI-ISS, the value of the Next A-BFT sub-field is greater than 0 and the value of the Unsolicited RSS Enabled sub-field is 1. Consequently, as indicated in step S250 in FIG. 10, the STA 200 responds with an unsolicited CBAP-RSS.

The SSW frames used in the unsolicited CBAP-RSS are the SSW frame F3 depicted in FIG. 11, for example, in which the value of the Direction sub-field is 1. Feedback that is based on the BTI-ISS received in the BTI period is included in the SSW-Feedback field of the SSW frame F3 transmitted by the STA 200 in the unsolicited CBAP-RSS.

The PCP/AP 100 transmits an SSW-FB in response to receiving the CBAP-RSS. Feedback that is based on the CBAP-RSS received by the PCP/AP 100 is included in the transmitted SSW-FB. Next, the STA 200 transmits an SSW-ACK in response to receiving the SSW-FB, and completes discovery.

In one example, the DMG beacon frames DBcn used in the BTI-ISS may include the number of receive DMG antennas (Number of RX DMG Antennas) that can be used for setting beamforming. For example, the STA 200 repeats a transmission sector sweep within the unsolicited CBAP-RSS in accordance with the number of receive DMG antennas included in the DMG beacon frames DBcn. By using a repeated transmission sector sweep, the PCP/AP 100 is able to execute beamforming through each receive DMG antenna of the PCP/AP 100.

In one example, the PCP/AP 100 may reduce the number of sectors used in a BTI-ISS to less than the number of sectors used in a CBAP-RSS, as long as the number of sectors is sufficient for the first communication with the STA 200 that executes discovery. By reducing the number of sectors, it is possible to limit the duration of the BTI.

Effects

In embodiment 1, the PCP/AP 100 includes the transmission wireless circuit 180 that transmits a first sector sweep (BTI-ISS), the reception wireless circuit 120 that receives a second sector sweep (RSS), and a control circuit (MAC processor 150) that generates beacon frames DBcn included in the first sector sweep. In addition, the control circuit (MAC processor 150) includes a first value (the value of an Unsolicited CBAP-RSS Enabled sub-field) in the beacon frames DBcn. The first value indicates whether or not feedback (SSW-FB field) corresponding to the first sector sweep is to be included and transmitted in the second sector sweep (unsolicited CBAP-RSS) by the transmission wireless circuit 180, in a case where the second sector sweep (unsolicited CBAP-RSS) received within an unslotted contention access period (CBAP) by the reception wireless circuit 120 is not a sector sweep in response to the first sector sweep.

By enabling unsolicited CBAP-RSSs after a BTI-ISS, it is possible to avoid a full SLS sequence within the CBAP depicted in FIG. 2 being executed by the STA 200. By avoiding execution of a full SLS sequence, it is possible to reduce the number of sector sweeps that are executed. Consequently, in a case where an A-BFT period is not included in the BI, by executing discovery using an unsolicited RSS sequence instead of a full SLS sequence, discovery can be completed quickly.

Furthermore, by using an unsolicited RSS sequence, compared to a case where a full SLS sequence is used, it is possible to reduce the number of sector sweeps that are executed, and therefore it is possible to also reduce interference in the BI and increase the probability of discovery success. Increasing the probability of discovery success contributes to increasing the speed of discovery. In addition, the PCP/AP 100 carries out discovery by executing an unsolicited RSS sequence in a case where an A-BFT period is not included in the BI, is therefore able to omit scheduling for an A-BFT, and is therefore able to support discovery.

In addition, according to embodiment 1, the Unsolicited RSS Enabled sub-field is present in a case where the value of the Next A-BFT sub-field has been set to a value greater than 0. In a case where the value of the Next A-BFT sub-field has been set to a value greater than 0, reference to the values of fields relating to A-BFT in a Beacon Interval Control field may be omitted. Consequently, it is possible to reuse bits for fields relating to A-BFT in the Beacon Interval Control field for bits for the Unsolicited RSS Enabled sub-field. In other words, according to embodiment 1, it is possible to omit adding new bits for the Unsolicited RSS Enabled sub-field to the DMG beacon frame, and therefore it is possible to enable unsolicited CBAP-RSSs and avoid an increase in the size of the DMG beacon frames.

Figure 13:
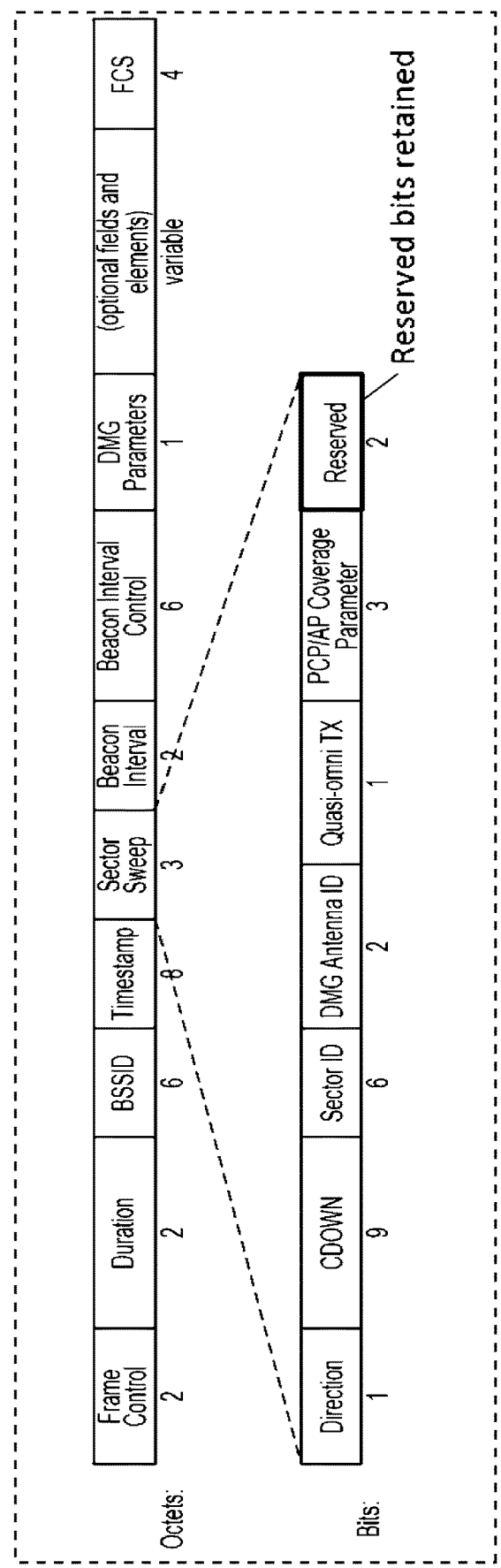
FIG. 13 is a drawing depicting an example of reserved bits, which are retained within DMG beacon frames.

FIG. 13 is a drawing depicting an example of reserved bits, which are retained within DMG beacon frames. According to embodiment 1, some or all of the general reserved bits, which are defined within the Sector Sweep field, for example, depicted in FIG. 13, can be used for another purpose.

It should be noted that the fields that can be used as the Unsolicited RSS Enabled sub-field are fields or sub-fields for which reference to the values may be omitted in the aforementioned case where an A-BFT period is not included in the BI, and are therefore not restricted to the fields or sub-fields mentioned above with reference to FIG. 9. For example, some of the Reserved sub-field of the Sector Sweep field depicted in FIG. 13 may be used instead of the aforementioned A-BFT Multiplier sub-field and the A-BFT in Secondary Channel sub-field.

It should be noted that the complexity of implementing the PCP/AP 100 may be reduced by the PCP/AP 100 deciding to not support unsolicited RSSs. Alternatively, unnecessary beamforming traffic may be reduced by the PCP/AP 100 not enabling unsolicited RSSs.

Embodiment 2

The PCP/AP 100 and the STA 200 according to embodiment 2 support unsolicited CBAP-RSSs. Embodiment 2 is different from embodiment 1 in that unsolicited CBAP-RSSs are executed in a case where an A-BFT-RSS executed when the value of the Next A-BFT sub-field is 0 has failed. In embodiment 2, a field or sub-field indicating whether or not unsolicited CBAP-RSSs are enabled is included within the DMG beacon frames DBcn also when the value of the Next A-BFT sub-field is 0.

Configuration Diagram

Reference will once again be made to FIG. 6. The PCP/AP 100 and the STA 200 according to embodiment 2 each include the antenna array 110, the reception wireless circuit 120, the A/D conversion circuit 130, the physical layer reception circuit 140, a MAC processor 150*a*, the physical layer transmission circuit 160, the D/A conversion circuit 170, and the transmission wireless circuit 180. Here, constituent elements of the PCP/AP 100 and the STA 200 other than the MAC processor 150*a* are the same as the constituent elements of the PCP/AP 100 and the STA 200 other than the MAC processor 150 according to embodiment 1 mentioned above with reference to FIG. 6, and descriptions thereof are omitted.

The MAC processor 150*a* processes MAC frames from reception frame data, and generates MAC frames as transmission frame data in accordance with a MAC protocol. In addition, the MAC processor 150*a* sends control signals to the physical layer reception circuit 140 and the physical layer transmission circuit 160.

The MAC processor 150*a* of the PCP/AP 100 generates DMG beacon frames that include an Unsolicited RSS Enabled sub-field having a value that is set to 0 or 1, in a BTI.

The MAC processor 150*a* of the STA 200 generates SSW frames that include a Direction sub-field having a value that is set to 1, and feedback that is based on a BTI-ISS, within an A-BFT period and within a DTI, in accordance with the Unsolicited RSS Enabled sub-field having a value that is set to 1, included in the DMG beacon frames processed in the BTI.

Operation of PCP/AP 100

The STA 200 that executes discovery with respect to the PCP/AP 100 receives the DMG beacon frames DBcn within a BTI-ISS before executing an SLS sequence. The PCP/AP 100, for example, changes the transmission sector for every DMG beacon frame DBcn, in a BTI-ISS carried out every fixed period. The generation of the DMG beacon frames DBcn transmitted by the PCP/AP 100 and the operation of the MAC processor 150*a* of the PCP/AP 100 will be described hereinafter.

Figure 14:
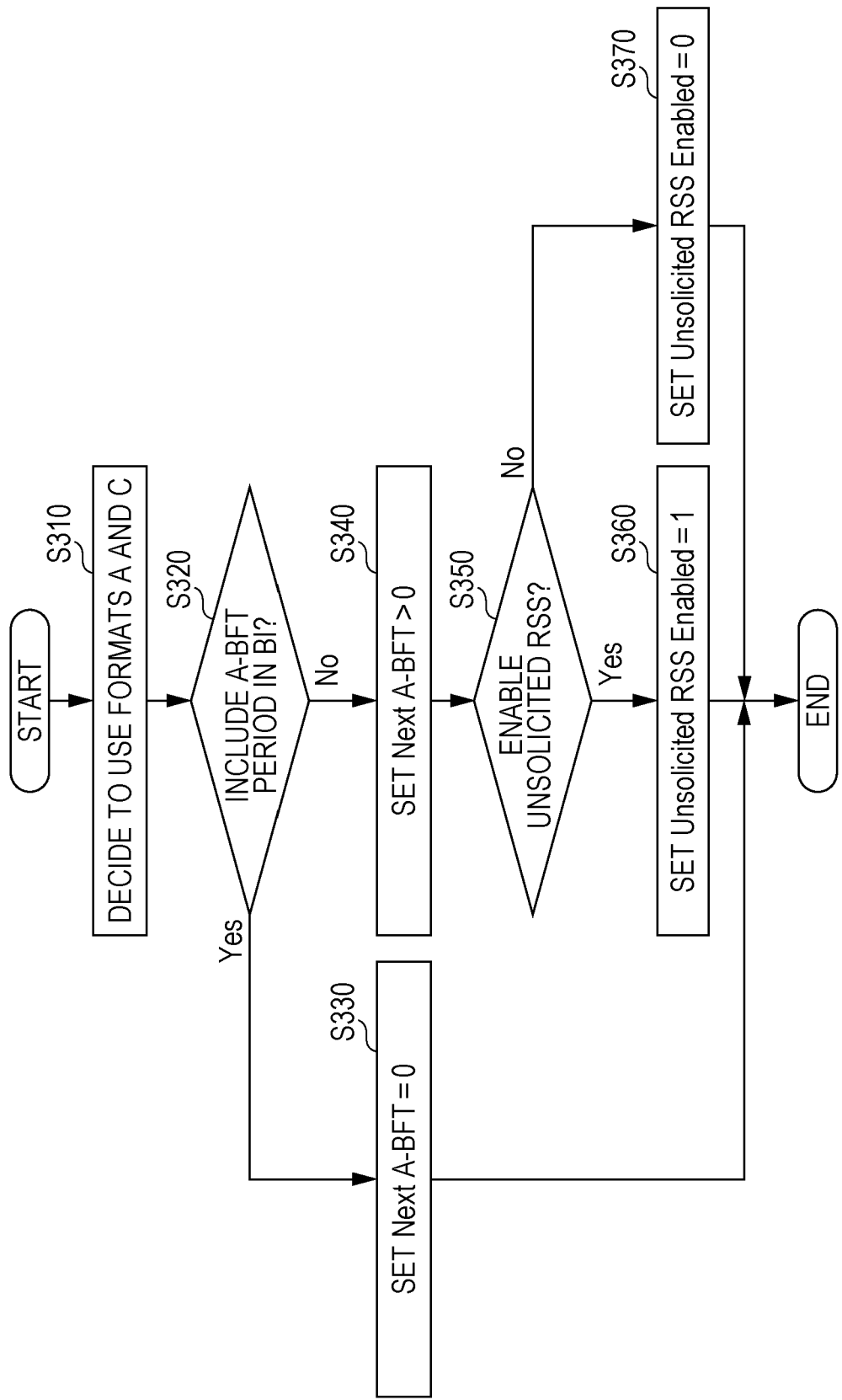
FIG. 14 is a flowchart depicting the operation of a MAC processor of a PCP/AP according to embodiment 2.

FIG. 14 is a flowchart depicting the operation of the MAC processor 150*a* of the PCP/AP 100 according to embodiment 2. In step S310, the MAC processor 150*a* decides to use format A for the Beacon Interval Control field and format C for the Sector Sweep field.

FIG. 15 is a drawing depicting an example of the format (format C) used for a Sector Sweep field F4 according to embodiment 2. The Sector sweep field F4 depicted in FIG. 15 is used for a Sector Sweep field within the reserved bits retained within the DMG beacon frames depicted in FIG. 13. One bit from among the two reserved bits of the Sector Sweep field depicted in FIG. 13 is allocated for an Unsolicited RSS Enabled sub-field.

In embodiment 2, the Unsolicited RSS Enabled sub-field is allocated within a field that is different from the fields relating to A-BFT. Consequently, also in a case where the value of the Next A-BFT sub-field is 0, the Unsolicited RSS Enabled sub-field is included within the DMG beacon frames DBcn without interfering with the fields relating to A-BFT.

Reference will once again be made to FIG. 14. In step S320, the MAC processor 150 of the PCP/AP 100 decides whether or not to include an A-BFT period in the BI.

In a case where an A-BFT period is included in the BI (step S320: yes), in step S330, the MAC processor 150a sets the value of the Next A-BFT sub-field of the Beacon Interval Control field to 0.

Meanwhile, in a case where an A-BFT period is not included in the BI (step S320: no), in step S340, the MAC processor 150a sets the value of the Next A-BFT sub-field of the Beacon Interval Control field to a value greater than 0.

In step S350, the MAC processor 150a decides whether or not to enable unsolicited RSSs.

For example, in a case where it is expected that the PCP/AP 100 will not use an RSS in the BI, such as when there is no broadcast CBAP that can be used, the MAC processor 150a may decide not to enable unsolicited RSSs. By not enabling unsolicited RSSs, the PCP/AP 100 is able to indicate that the STA 200 is to wait until another BI in which an A-BFT period is included in the BI or unsolicited RSSs are enabled.

Furthermore, for example, in a case where the number of connections or BSS performance of the PCP/AP 100 reaches a threshold value, the MAC processor 150a may decide not to enable unsolicited RSSs. By not enabling unsolicited RSSs, the PCP/AP 100 is able to prompt the STA 200 to participate in another BSS. It should be noted that the MAC processor 150a may decide to enable unsolicited RSSs in cases other than the aforementioned.

In a case where unsolicited RSSs are enabled (step S350: yes), in step S360, the MAC processor 150a sets the value of the Unsolicited RSS Enabled sub-field of the Sector Sweep field F4 to 1.

Meanwhile, in a case where unsolicited RSSs are not enabled (step S350: no), in step S370, the MAC processor 150a sets the value of the Unsolicited RSS Enabled sub-field of the Sector Sweep field F4 to 0.

The processing flow ends once step S330, S360, or S370 has been executed.

Operation of STA 200

Next, a description will be given regarding the content of processing for RSS execution by the STA 200 having received DMG beacon frames DBcn generated according to the flowchart depicted in FIG. 14.

Figure 16:
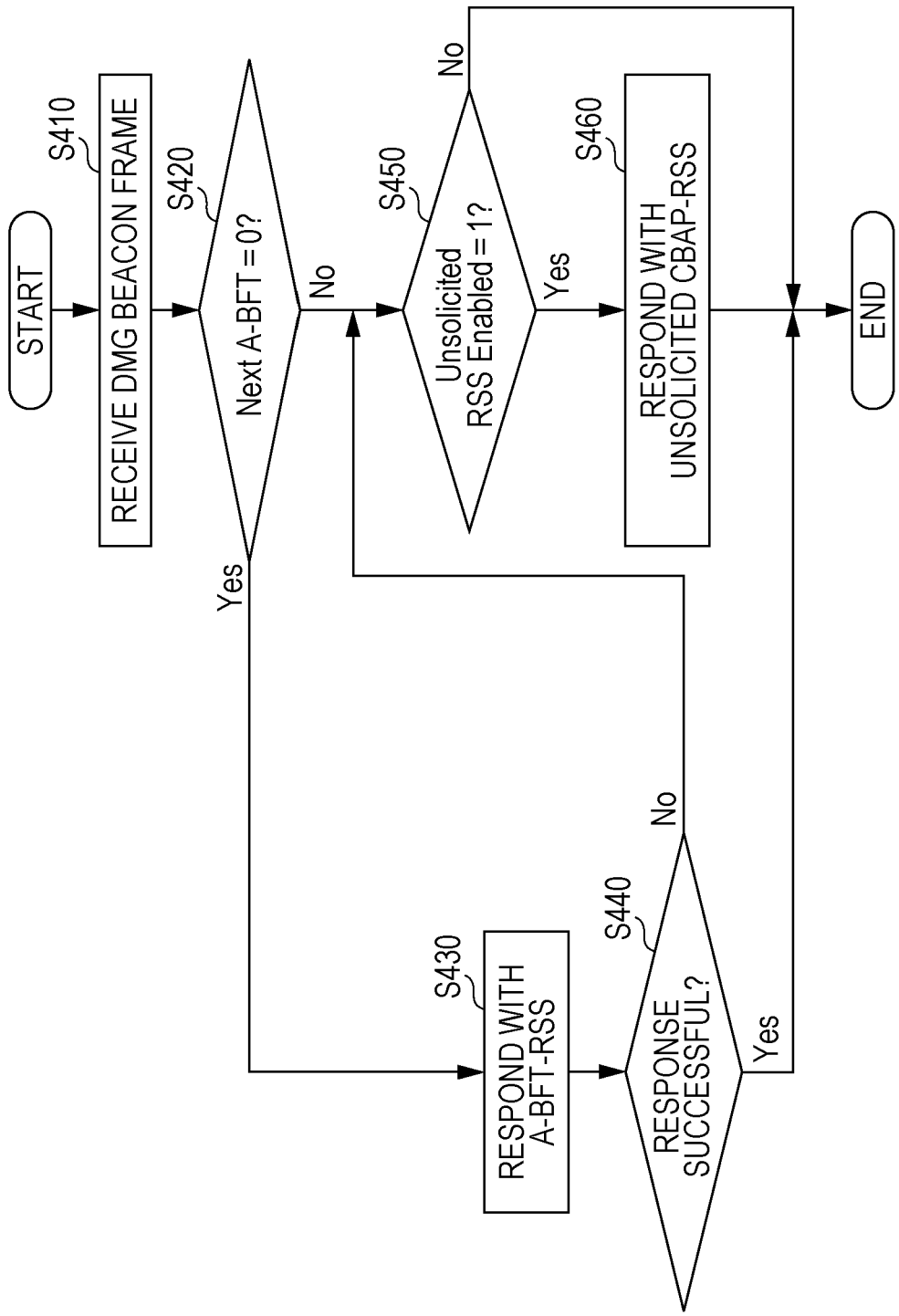
FIG. 16 is a flowchart depicting the operation of a STA according to embodiment 2.

FIG. 16 is a flowchart depicting the operation of the STA 200 according to embodiment 2. In step S410, the STA 200 receives the DMG beacon frames DBcn transmitted by the PCP/AP 100, which is indicated in the BTI in FIGS. 1 and 17, for example.

In step S420, the STA 200 determines whether or not the value of the Next A-BFT sub-field of the DMG beacon frames DBcn is 0. In a case where the value of the Next A-BFT sub-field is not 0 (step S420: no) the flow proceeds to step S450.

Meanwhile, in a case where the value of the Next A-BFT sub-field is 0 (step S420: yes), in step S430, the STA 200 responds with an A-BFT-RSS. For example, the STA 200 executes an SLS sequence that uses the A-BFT-RSS mentioned above with reference to FIG. 1.

In step S440, the STA 200 determines whether or not the response by means of the A-BFT-RSS has been successful. For example, the STA 200 determines that the response by means of the A-BFT-RSS has been successful in a case where an SSW-FB for the A-BFT-RSS has been received. In a case where the response has been successful (step S440: yes), the flow ends. Meanwhile, in a case where the response has not been successful (step S440: no), the flow proceeds to step S450.

In step S450, the STA 200 determines whether or not the value of the Unsolicited RSS Enabled sub-field of the DMG beacon frames DBcn is 1.

In a case where the value of the Unsolicited RSS Enabled sub-field is 1 (step S450: yes), in step S460, the STA 200 responds with an unsolicited CBAP-RSS, and the flow ends. The operation of responding with an unsolicited CBAP-RSS is the same as the operation described with reference to FIG. 11 in embodiment 1, and therefore a description thereof is omitted.

Meanwhile, in a case where the value of the Unsolicited RSS Enabled sub-field is not 1 (step S450: no), the flow ends.

Discovery

The SLS sequence in discovery according to embodiment 2 in which the Sector Sweep field F4 and the SSW frame F3 are used, mentioned above with reference to FIGS. 15 and 11, will be described hereinafter with reference to the flowcharts depicted in FIGS. 14 and 16.

Figure 17:
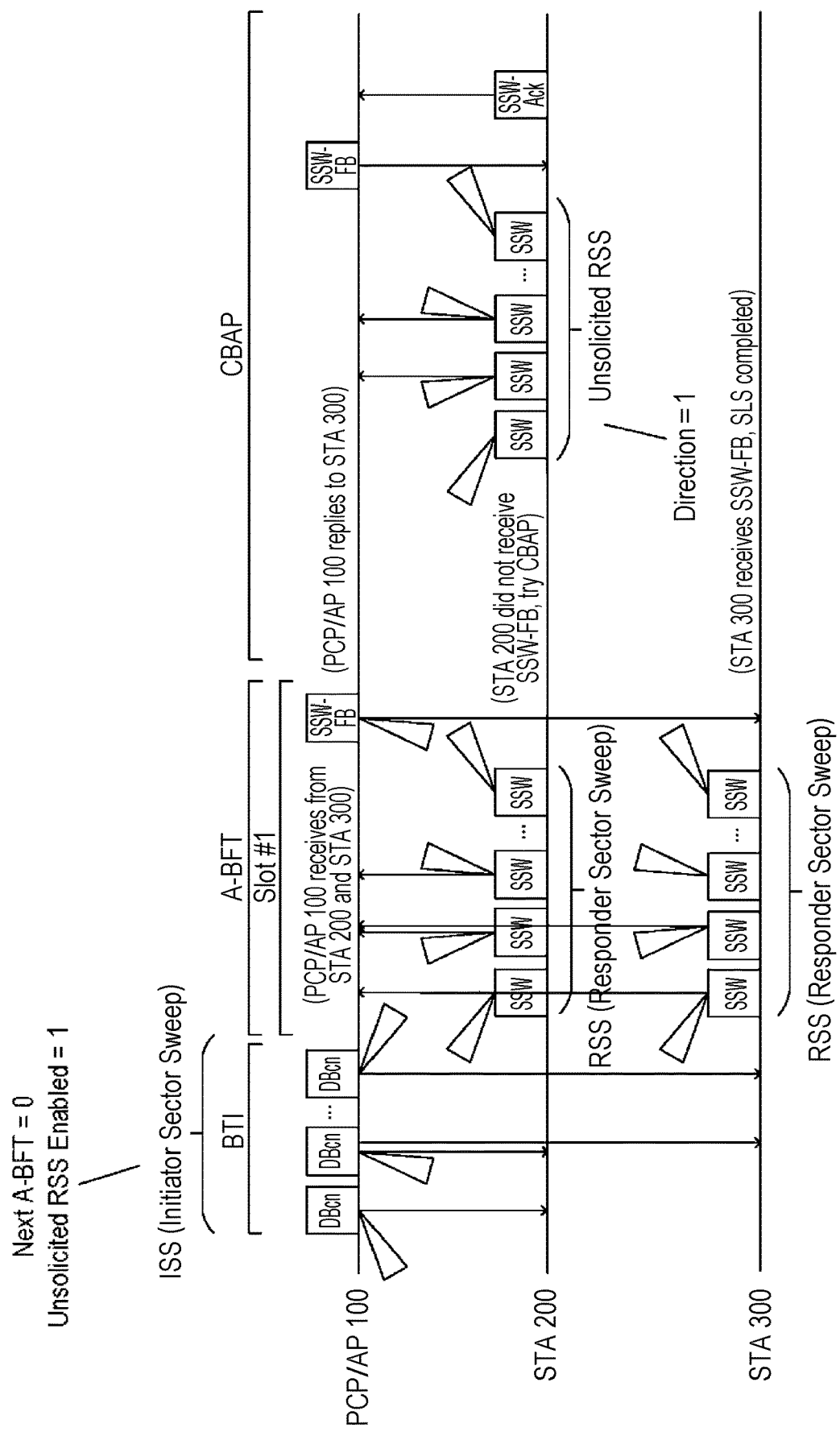
FIG. 17 is a drawing depicting an example of an SLS sequence in discovery according to embodiment 2.

FIG. 17 is a drawing depicting an example of an SLS sequence in discovery according to embodiment 2. The PCP/AP 100 transmits a BTI-ISS using DMG beacon frames DBcn generated by the MAC processor 150a. For example, the MAC processor 150a generates DMG beacon frames DBcn by executing step S330 in FIG. 14. As depicted in FIG. 17, the value of the Unsolicited RSS Enabled sub-field of the DMG beacon frames DBcn is 1. Meanwhile, the value of the Next A-BFT sub-field of the DMG beacon frames DBcn is set to 0 indicating that an A-BFT period is included in the BI.

The STA 200 and the STA 300 start RSSs in response to receiving the BTI-ISS.

As mentioned above, in the DMG beacon frames DBcn used in the BTI-ISS, the value of the Next A-BFT sub-field is set to 0, and therefore the STA 200 and the STA 300 attempt an A-BFT-RSS, as depicted in FIG. 17.

The STA 300 receives an SSW-FB, as depicted in FIG. 17, for example. The STA 300 having received the SSW-FB completes discovery.

Meanwhile, the STA 200 does not receive an SSW-FB, as depicted in FIG. 17. Consequently, in step S440 in FIG. 16, the response using the A-BFT-RSS fails, and the STA 200 determines that discovery has failed. A feasible cause for not having received an SSW-FB is a large number of devices (STAs) having executed A-BFT-RSSs in the same slot, or noise, for example.

Consequently, in step S460 in FIG. 16, the STA 200 responds with an unsolicited CBAP-RSS. The SSW frames used in the unsolicited CBAP-RSS are the SSW frame F3 depicted in FIG. 11, for example, in which the value of the Direction sub-field is 1. The transmitted SSW frames include feedback that is based on the BTI-ISS received by the STA 200.

As depicted in FIG. 17, the PCP/AP 100 transmits an SSW-FB in response to receiving the CBAP-RSS. Feedback that is based on the CBAP-RSS received by the PCP/AP 100 is included in the transmitted SSW-FB. Next, the STA 200 transmits an SSW-ACK in response to receiving the SSW-FB, and completes discovery.

Effects

According to embodiment 2, the Unsolicited RSS Enabled sub-field is included in the DMG beacon frames DBcn. Consequently, the STA 200 is able to quickly recover from a failed A-BFT-RSS by starting unsolicited CBAP-RSSs after a BTI-ISS, as depicted in FIG. 17, for example. Meanwhile, the CBAP-RSS according to embodiment 2 has little received interference compared to the full SLS sequence depicted in FIG. 2. In addition, in a CBAP-RSS, a larger number of sectors can be trained than in an A-BFT-RSS.

Embodiment 3

The PCP/AP 100 and the STA 200 according to embodiment 3 support unsolicited CBAP-RSSs. Embodiment 3 is different from embodiment 2 in that unsolicited CBAP-RSSs are executed in a case where the value of the Next A-BFT sub-field is 0 and it is determined that the execution of an A-BFT-RSS is to be skipped. Also in embodiment 3, similar to embodiment 2, also in a case where the value of the Next A-BFT sub-field is 0, a field indicating whether or not unsolicited CBAP-RSSs are enabled may be included within the DMG beacon frames DBcn.

Configuration Diagram

Reference will once again be made to FIG. 6. The PCP/AP 100 and the STA 200 according to embodiment 3 each include the antenna array 110, the reception wireless circuit 120, the A/D conversion circuit 130, the physical layer reception circuit 140, a MAC processor 150*b*, the physical layer transmission circuit 160, the D/A conversion circuit 170, and the transmission wireless circuit 180. Here, constituent elements of the PCP/AP 100 and the STA 200 other than the MAC processor 150*b* are the same as the constituent elements of the PCP/AP 100 and the STA 200 other than the MAC processor 150 according to embodiment 1 mentioned above with reference to FIG. 6, and descriptions thereof are omitted.

The MAC processor 150*b* processes MAC frames from reception frame data, and generates MAC frames as transmission frame data in accordance with a MAC protocol. In addition, the MAC processor 150*b* sends control signals to the physical layer reception circuit 140 and the physical layer transmission circuit 160.

The MAC processor 150*b* of the PCP/AP 100 generates DMG beacon frames that include an Unsolicited RSS Enabled sub-field having a value that is set to 0 or 1, in a BTI.

The MAC processor 150*b* of the STA 200 generates SSW frames that include a Direction sub-field that is set to 1, and feedback that is based on a BTI-ISS, within an A-BFT period or within a DTI, on the basis of parameters relating to A-BFT within the DMG beacon frames processed in the BTI.

Operation of PCP/AP 100

The STA 200 that executes discovery with respect to the PCP/AP 100 receives the DMG beacon frames DBcn within a BTI-ISS before executing an SLS sequence. The PCP/AP 100, for example, changes the transmission sector for every DMG beacon frame DBcn, in a BTI-ISS carried out every fixed period. The operation of the MAC processor 150*b* that generates DMG beacon frames DBcn in embodiment 3 is the same as the operation of the MAC processor 150*a* in embodiment 2, and descriptions thereof are omitted.

Operation of STA 200

Next, a description will be given regarding the content of processing for RSS execution by the STA 200 having received DMG beacon frames DBcn in accordance with the flowchart depicted in FIG. 18.

Figure 18:
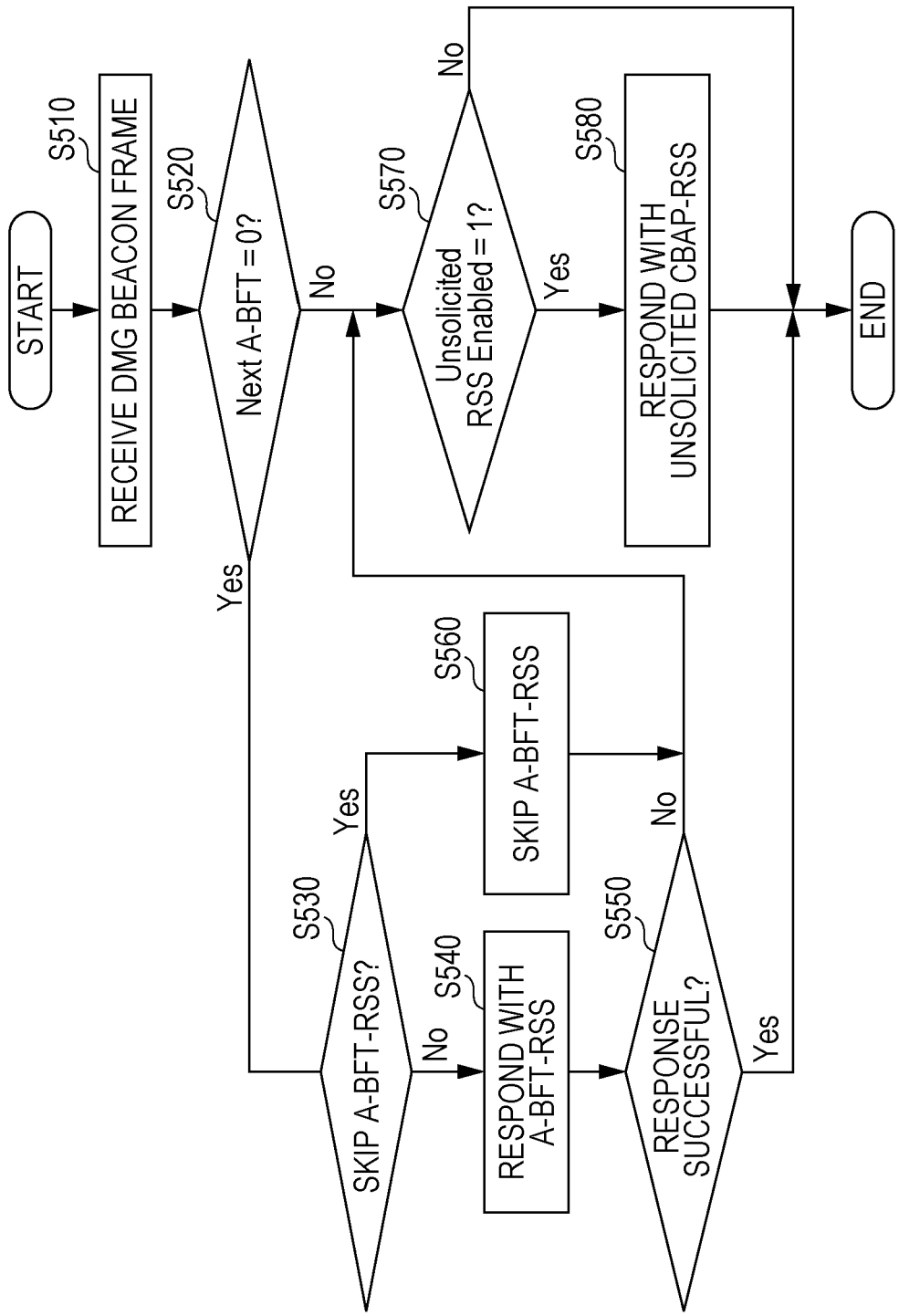
FIG. 18 is a flowchart depicting the operation of a STA according to embodiment 3.

FIG. 18 is a flowchart depicting the operation of the STA 200 according to embodiment 3. In step S510, the STA 200 receives the DMG beacon frames DBcn transmitted by the PCP/AP 100.

In step S520, the STA 200 determines whether or not the value of the Next A-BFT sub-field of the DMG beacon frames DBcn is 0. In a case where the value of the Next A-BFT sub-field is not 0 (step S520: no) the flow proceeds to step S570.

Meanwhile, in a case where the value of the Next A-BFT sub-field is 0 (step S520: yes), in step S530, the STA 200 decides whether or not to skip an A-BFT-RSS. For example, the STA 200 may decide to skip an A-BFT-RSS in a case where the number of sectors intended to be swept in an RSS exceeds the number of sectors that can be swept in an A-BFT period.

Furthermore, for example, the STA 200 may decide to skip an A-BFT-RSS in a case where another STA is detected and it is determined that the there is a high probability of collision with the other detected STA. For example, the STA 200 may calculate the probability of collision with the other STA on the basis of a history of collision occurrences up to the previous time. Furthermore, for example, the STA 200 may decide whether or not to skip an A-BFT-RSS, on the basis of the A-BFT parameters.

In a case where the A-BFT-RSS is not to be skipped (step S530: no), in step S540, the STA 200 responds with an A-BFT-RSS. For example, the STA 200 executes an SLS sequence that uses the A-BFT-RSS mentioned above with reference to FIG. 1.

In step S550, the STA 200 determines whether or not the response by means of the A-BFT-RSS has been successful. For example, the STA 200 determines that the response by means of the A-BFT-RSS has been successful in a case where an SSW-FB for the A-BFT-RSS has been received. In a case where the response has been successful (step S550: yes), the flow ends. Meanwhile, in a case where the response has not been successful (step S550: no), the flow proceeds to step S570.

In a case where the A-BFT-RSS is to be skipped (step S530: yes), in step S560, the STA 200 does not execute (skips) an A-BFT-RSS in the A-BFT period. The flow then proceeds to step S570.

In step S570, the STA 200 determines whether or not the value of the Unsolicited RSS Enabled sub-field of the DMG beacon frames DBcn is 1.

In a case where the value of the Unsolicited RSS Enabled sub-field is 1 (step S570: yes), in step S580, the STA 200 responds with an unsolicited CBAP-RSS, and the flow ends. The operation of responding with an unsolicited CBAP-RSS is the same as the operation described with reference to FIG. 11 in embodiment 1, and therefore a description thereof is omitted.

Meanwhile, in a case where the value of the Unsolicited RSS Enabled sub-field is not 1 (step S570: no), the flow ends.

Discovery

The SLS sequence in discovery according to embodiment 3 in which the Sector Sweep field F4 and the SSW frame F3 are used, mentioned above with reference to FIGS. 15 and 11, will be described hereinafter with reference to the flowcharts depicted in FIGS. 14 and 18.

Figure 19:
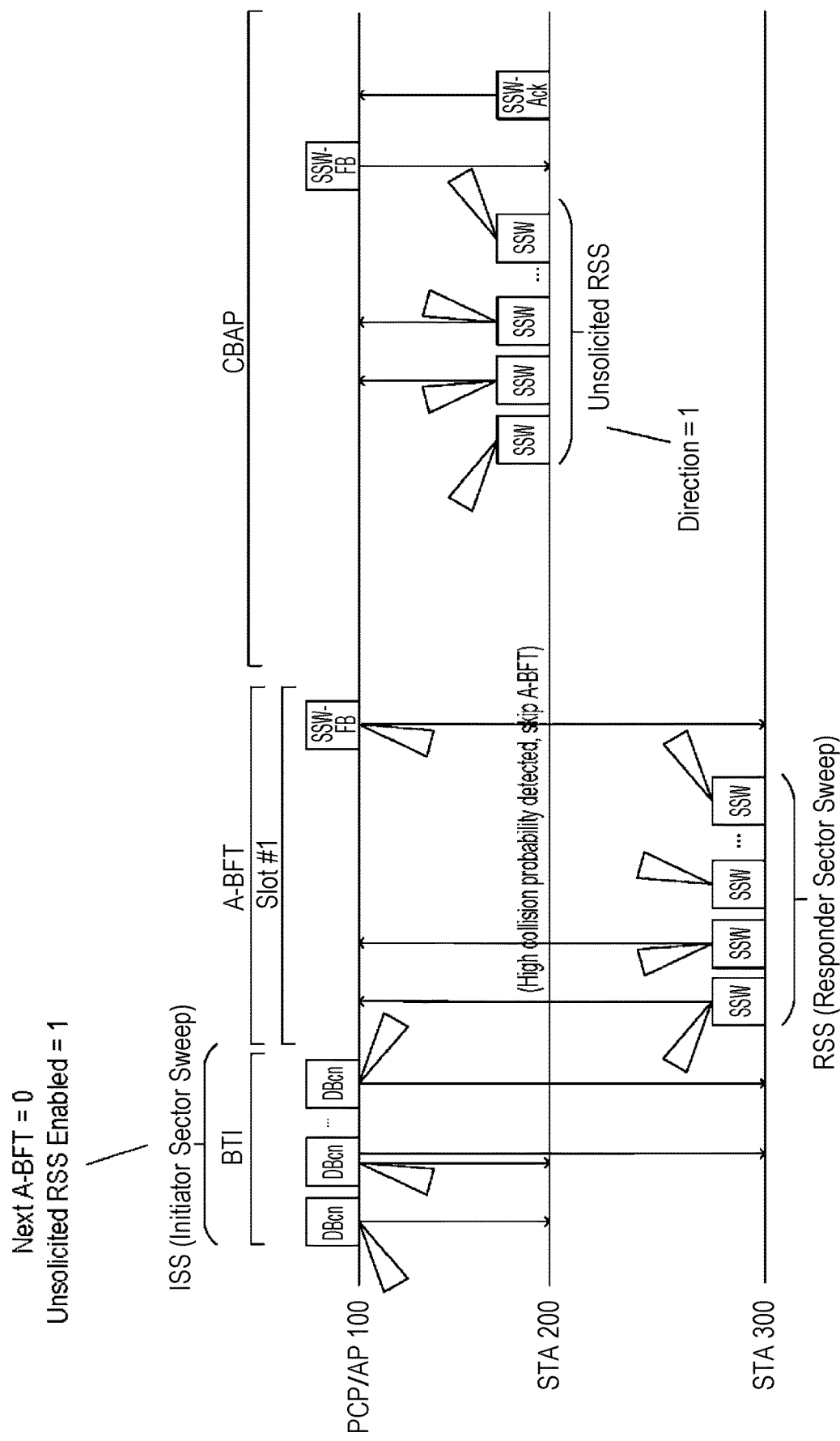
FIG. 19 is a drawing depicting an example of an SLS sequence in discovery according to embodiment 3.

FIG. 19 is a drawing depicting an example of an SLS sequence in discovery according to embodiment 3. The PCP/AP 100 carries out a BTI-ISS using DMG beacon frames DBcn generated by the MAC processor 150b. For example, the MAC processor 150b executes step S330 in FIG. 14 to generate DMG beacon frames DBcn. As depicted in FIG. 19, the value of the Unsolicited RSS Enabled sub-field of the DMG beacon frames DBcn is set to 1. Meanwhile, the value of the Next A-BFT sub-field of the DMG beacon frames DBcn is set to 0 indicating that an A-BFT period is included in the BI.

The STA 200 and the STA 300 start RSSs in response to receiving the BTI-ISS. As mentioned above, in the DMG beacon frames DBcn used in the BTI-ISS, the value of the Next A-BFT sub-field is set to 0, and therefore the STA 200 and the STA 300 decide whether or not to skip an A-BFT-RSS.

The STA 300 having decided to not skip an A-BFT-RSS attempts an A-BFT-RSS, as depicted in FIG. 19. The STA 300 then receives an SSW-FB, as depicted in FIG. 19. The STA 300 having received the SSW-FB completes discovery.

Meanwhile, the STA 200, which decided to skip an A-BFT-RSS in step S560 in FIG. 18, does not attempt (skips) an A-BFT-RSS in the A-BFT period depicted in FIG. 19.

Then, in step S580 in FIG. 18, the STA 200 responds with an unsolicited CBAP-RSS. The SSW frames used in the unsolicited CBAP-RSS are the SSW frame F3 depicted in FIG. 11, for example, in which the value of the Direction sub-field is 1.

As depicted in FIG. 19, the PCP/AP 100 transmits an SSW-FB in response to receiving the CBAP-RSS. Feedback that is based on the CBAP-RSS received by the PCP/AP 100 is included in the transmitted SSW-FB. The STA 200 then transmits an SSW-ACK in response to receiving the SSW-FB, and completes discovery.

Effects

According to embodiment 3, the Unsolicited RSS Enabled sub-field is included in the DMG beacon frames DBcn. Consequently, for example, the STA 200 is able to decide to skip an A-BFT-RSS and execute an unsolicited CBAP-RSS instead, as depicted in FIG. 19.

Furthermore, according to embodiment 3, for example, in a case where a high collision probability is expected, the STA 200 skips an A-BFT-RSS, and is thereby able to reduce the probability of the SLS sequence in the A-BFT period failing and increase the probability of discovery succeeding.

Furthermore, according to embodiment 3, with respect to the STA 200, the STA 200 may skip an A-BFT-RSS in a case where the number of sectors used for beamforming exceeds the number of sectors that can be swept in an A-BFT period, for example. By skipping, it is possible to reduce the probability of colliding with another device (another STA) that executes an A-BFT-RSS.

Embodiment 4

The PCP/AP 100 and the STA 200 according to embodiment 4 support unsolicited CBAP-RSSs. In embodiment 1, unsolicited CBAP-RSSs are executed using SSW frames, whereas, in embodiment 4, unsolicited CBAP-RSSs are executed using short SSW packets in the case where short SSW packets can be used.

Configuration Diagram

Reference will once again be made to FIG. 6. The PCP/AP 100 and the STA 200 according to embodiment 4 are each provided with the antenna array 110, the reception wireless circuit 120, the A/D conversion circuit 130, the physical layer reception circuit 140, a MAC processor 150c, the physical layer transmission circuit 160, the D/A conversion circuit 170, and the transmission wireless circuit 180. Here, constituent elements of the PCP/AP 100 and the STA 200 other than the MAC processor 150c are the same as the constituent elements of the PCP/AP 100 and the STA 200 other than the MAC processor 150 according to embodiment 1 mentioned above with reference to FIG. 6, and descriptions thereof are omitted.

The MAC processor 150c processes MAC frames from reception frame data, and generates MAC frames as transmission frame data in accordance with a MAC protocol. In addition, the MAC processor 150c sends control signals to the physical layer reception circuit 140 and the physical layer transmission circuit 160.

The MAC processor 150c of the PCP/AP 100 generates DMG beacon frames DBcn that include a Next A-BFT sub-field having a value that is set to a value greater than 0, and an Unsolicited RSS Enabled sub-field having a value that is set to 0 or 1, in a BTI.

The MAC processor 150c of the STA 200 processes DMG beacon frames DBcn that include an Unsolicited RSS Enabled sub-field having a value that is set to 1, in the BTI. Next, short SSW packets that include a Direction sub-field having a value that is set to 1, a Format Type having a value that is set to 1, and feedback that is based on a BTI-ISS are generated in a DTI.

Operation of PCP/AP 100

The STA 200 that executes discovery with respect to the PCP/AP 100 receives the DMG beacon frames DBcn within a BTI-ISS before executing an SLS sequence. The PCP/AP 100, for example, changes the transmission sector for every DMG beacon frame DBcn, in a BTI-ISS carried out every fixed period. The generation of the DMG beacon frames DBcn transmitted by the PCP/AP 100 and the operation of the MAC processor 150c of the PCP/AP 100 will be described hereinafter.

Figure 20:
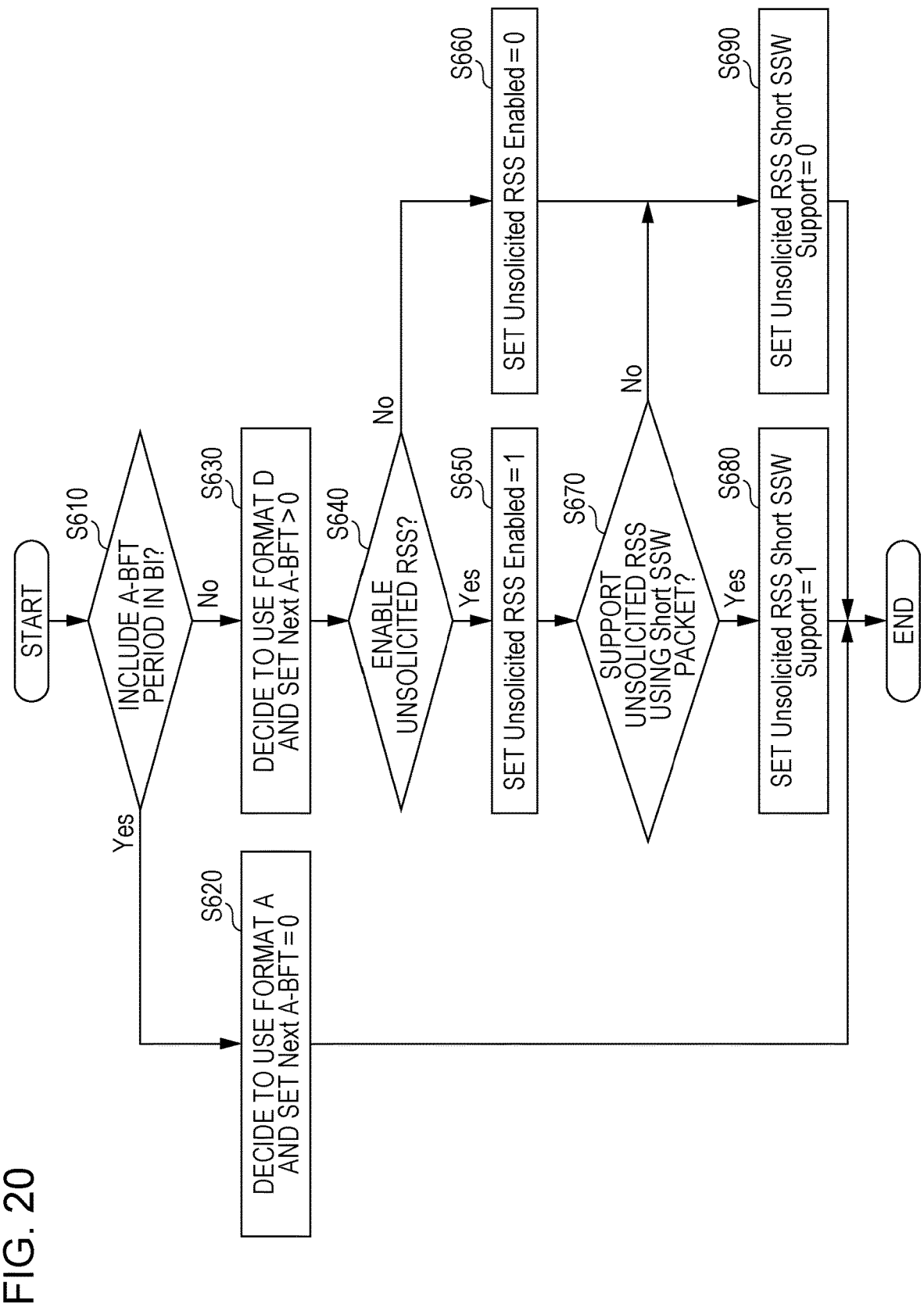
FIG. 20 is a flowchart depicting the operation of a MAC processor of a PCP/AP according to embodiment 4.

FIG. 20 is a flowchart depicting the operation of the MAC processor 150c of the PCP/AP 100 according to embodiment 4. In step S610, the MAC processor 150c of the PCP/AP 100 decides whether or not to include an A-BFT period in a BI.

In a case where an A-BFT period is included in the BI (step S610: yes) the flow proceeds to step S620. The processing content of step S620 is the same as the processing content of step S120 depicted in FIG. 8, and a description thereof is omitted.

Meanwhile, in a case where an A-BFT period is not included in the BI (step S610: no), in step S630, the MAC processor 150c decides to use format D for the Beacon Interval Control field of the DMG beacon frames DBcn used to execute a BTI-ISS. Next, the value of the Next A-BFT sub-field of the Beacon Interval Control field is set to a value greater than 0.

Figure 21:
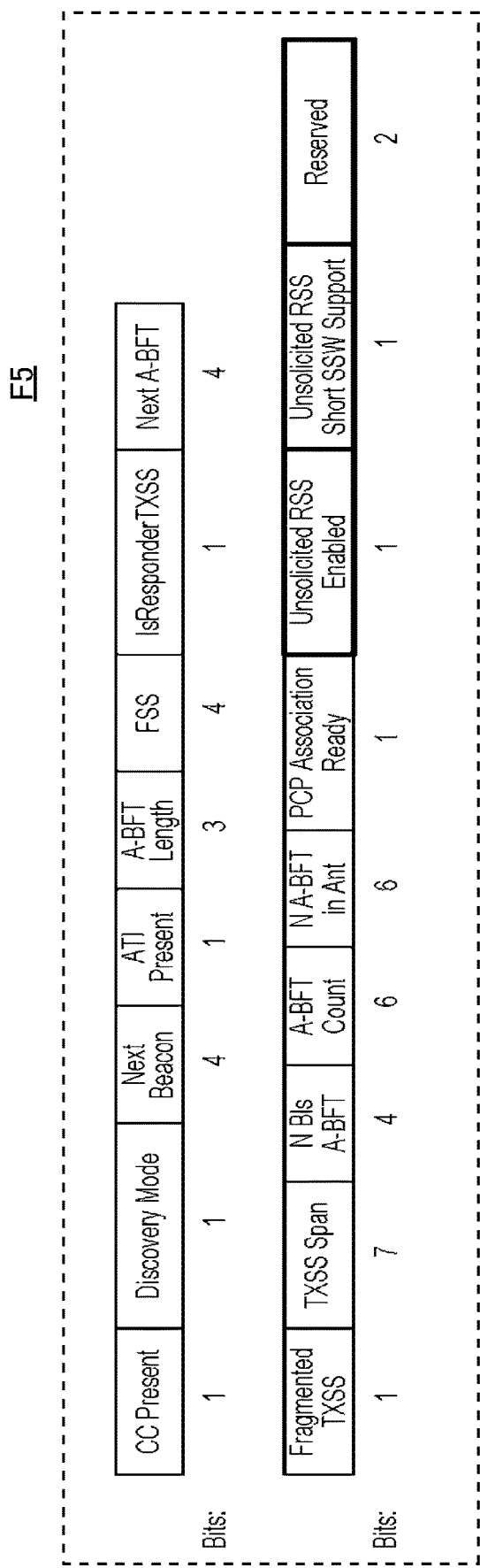
FIG. 21 is a drawing depicting another example of a format (format D) used for a Beacon Interval Control field according to embodiment 4.

FIG. 21 is a drawing depicting another example of a format (format D) used for a Beacon Interval Control field F5 according to embodiment 4. Similar to format B described with reference to FIG. 9B, fields or sub-fields that store parameters relating to A-BFT may also be omitted in format D. Here, fields or sub-fields that store parameters relating to A-BFT are, for example, the A-BFT Multiplier sub-field and the A-BFT in Secondary Channel sub-field included in format A.

Consequently, in format D, the fields that store parameters relating to A-BFT are used and changed to an Unsolicited RSS Enabled sub-field for indicating support for responding to unsolicited RSSs within a CBAP, and an Unsolicited RSS Short SSW Support sub-field.

For example, in a case where it is indicated that responding to unsolicited RSSs within a CBAP is supported, the MAC processor 150c sets the value of the Unsolicited RSS Enabled sub-field to 1. Furthermore, for example, in a case where it is indicated that responding to unsolicited RSSs within a CBAP is not supported, the MAC processor 150c sets the value of the Unsolicited RSS Enabled sub-field to 0. Furthermore, for example, in a case where it is indicated that responding to unsolicited RSSs within a CBAP for which short SSW packets are used is supported, the MAC processor 150c sets the value of the Unsolicited RSS Short SSW Support sub-field to 1. Furthermore, for example, in a case where it is indicated that responding to unsolicited RSSs within a CBAP for which short SSW packets are used is not supported, the MAC processor 150c sets the value of the Unsolicited RSS Short SSW Support sub-field to 0.

It should be noted that a field or sub-field used as an Unsolicited RSS Support sub-field may be any field or sub-field as long as it is a field or sub-field that may be omitted in a case where an A-BFT period is not included in the BI.

In step S640, the MAC processor 150c decides whether or not to enable unsolicited RSSs.

In a case where unsolicited RSSs are enabled (step S640: yes), in step S650, the MAC processor 150c sets the value of the Unsolicited RSS Enabled sub-field to 1. Meanwhile, in a case where unsolicited RSSs are not enabled (step S640: no), in step S660, the MAC processor 150c sets the value of the Unsolicited RSS Enabled sub-field to 0, and proceeds to step S690.

In step S670, the MAC processor 150c decides whether or not to support unsolicited RSSs that use short SSW packets.

In a case where unsolicited RSSs that use short SSW packets are supported (step S670: yes), in step S680, the MAC processor 150c sets the value of the Unsolicited RSS Short SSW Support (short SSW-using unsolicited RSS support) sub-field to 1. Meanwhile, in a case where unsolicited RSSs that use short SSW packets are not supported (step S670: no), in step S690, the MAC processor 150c sets the value of the Unsolicited RSS Short SSW Support sub-field to 0.

The processing flow ends once step S620, S680, or S690 has been executed.

Operation of STA 200

Next, a description will be given regarding the content of processing for RSS execution by the STA 200 having received DMG beacon frames DBcn generated according to the flowchart depicted in FIG. 20.

FIG. 22 is a flowchart depicting the operation of the STA 200 according to embodiment 4. In step S710, the STA 200 receives the DMG beacon frames DBcn transmitted by the PCP/AP 100.

In step S720, the STA 200 determines whether or not the value of the Next A-BFT sub-field of the DMG beacon frames DBcn is 0.

In a case where the value of the Next A-BFT sub-field is 0 (step S720: yes), in step S730, the STA 200 responds with an A-BFT-RSS, and the flow ends. For example, the STA 200 executes an SLS sequence that uses the A-BFT-RSS mentioned above with reference to FIG. 1.

Meanwhile, in a case where the value of the Next A-BFT sub-field is not 0 (step S720: no), in step S740, the STA 200 determines whether or not the value of the Unsolicited RSS Short SSW Support sub-field of the DMG beacon frames DBcn is 1.

In a case where the value of the Unsolicited RSS Short SSW Support sub-field is 1 (step S740: yes), in step S750, the STA 200 responds with an unsolicited CBAP-RSS using a short SSW, and the flow ends. The operation of responding with an unsolicited CBAP-RSS will be described hereinafter.

Figure 23A:
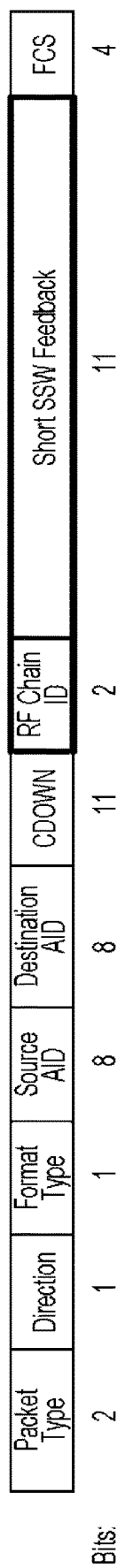
FIG. 23A is a drawing depicting an example of a format (Format Type 0) of a short SSW packet transmitted in an RSS.

FIG. 23A is a drawing depicting an example of a format (Format Type 0) of a short SSW packet P1 transmitted in an RSS. The short SSW packet P1 depicted in FIG. 23A is used with the value of a Format Type field being set to 0 or 1 and the value of a Direction sub-field being set to 1.

FIG. 23B is a drawing depicting an example of a format (Format Type 1) of a short SSW packet P2 transmitted in an unsolicited CBAP-RSS. The short SSW packet P2 depicted in FIG. 23B is used with the values of the Format Type sub-field and the Direction sub-field being set to 1. In the case of an unsolicited CBAP-RSS, the value of the Direction sub-field of the SSW frame F3 is set to 1. Since the value of the Format Type sub-field is 1, the short SSW packet P2 in which Type=1 is used. Furthermore, by setting the value of the Direction sub-field to 1, it is indicated that the transmission of the short SSW packet P2 has been carried out by a responder such as the STA 200 in FIG. 24.

Reference will once again be made to FIG. 22. Meanwhile, in a case where the value of the Unsolicited RSS Short SSW Support sub-field is not 1 (step S740: no), in step S760, the STA 200 determines whether or not the value of the Unsolicited RSS Enabled sub-field of the DMG beacon frames DBcn is 1.

In a case where the value of the Unsolicited RSS Enabled sub-field is 1 (step S760: yes), in step S770, the STA 200 responds with an unsolicited CBAP-RSS, and the flow ends. The operation of responding with an unsolicited CBAP-RSS in step S770 is the same as the operation mentioned above with reference to step S250, and a description thereof is omitted.

Meanwhile, in a case where the value of the Unsolicited RSS Enabled sub-field is not 1 (step S760: no), the flow ends.

Discovery

The SLS sequence in discovery according to embodiment 4 in which a Beacon Period Control field F5 and the short SSW packet P2 are used, mentioned above with reference to FIGS. 21 and 23B, will be described hereinafter with reference to the flowcharts depicted in FIGS. 20 and 22.

Figure 24:
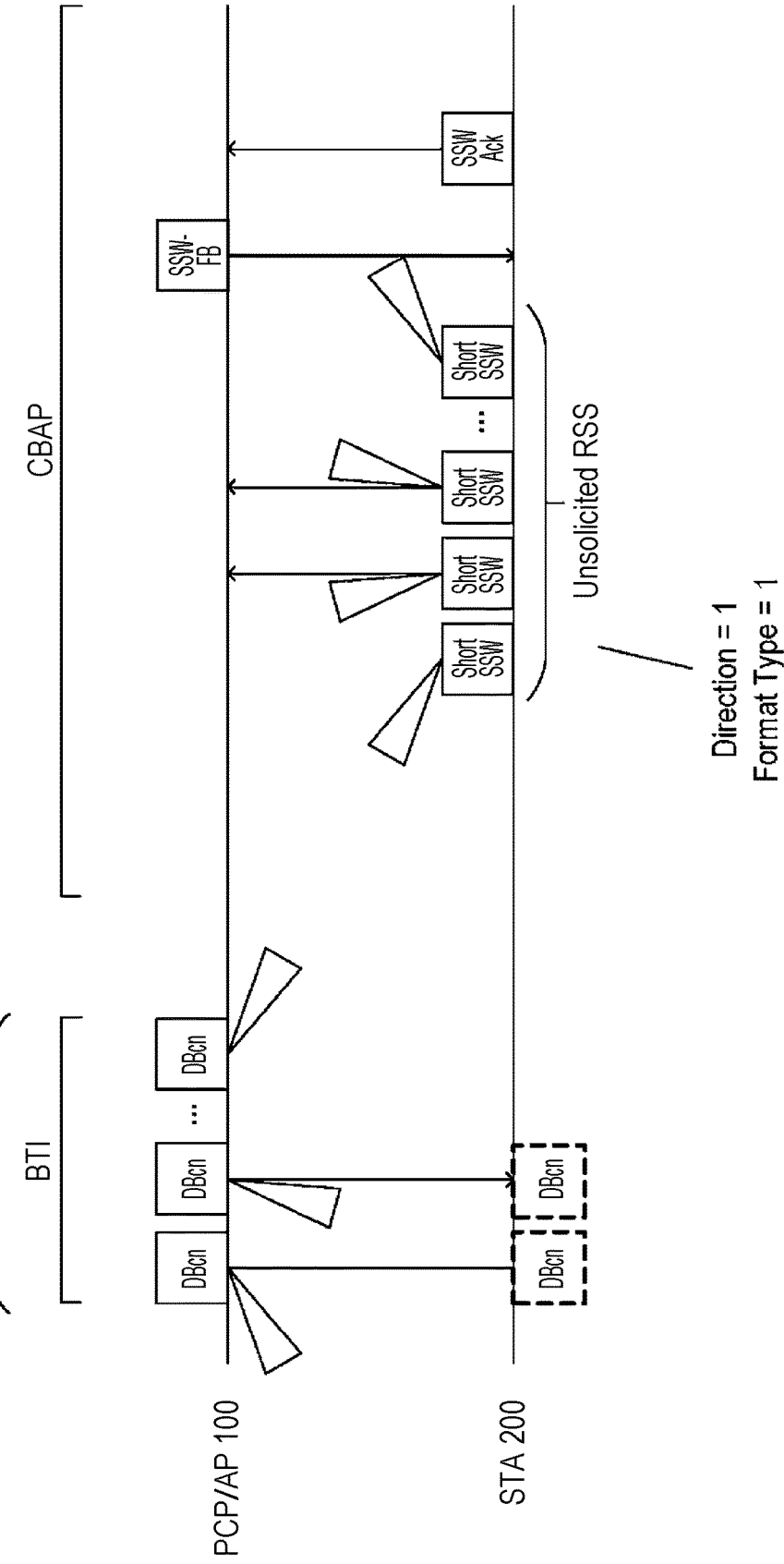
FIG. 24 is a drawing depicting an example of an SLS sequence in discovery according to embodiment 4.

FIG. 24 is a drawing depicting an example of an SLS sequence in discovery according to embodiment 4. The PCP/AP 100 transmits a BTI-ISS using DMG beacon frames DBcn generated by the MAC processor 150c. For example, DMG beacon frames DBcn are generated by the MAC processor 150c executing steps S630, S650, and S680 in FIG. 20. As depicted in FIG. 24, in the DMG beacon frames DBcn, the value of the Next A-BFT sub-field is greater than 0 and the value of the Unsolicited RSS Enabled sub-field is 1. In addition, the value of the Unsolicited RSS Short SSW Support sub-field is 1.

The STA 200 starts an RSS in response to receiving the BTI-ISS. As mentioned above, in the DMG beacon frames DBcn used in the BTI-ISS, the value of the Next A-BFT sub-field is greater than 0 and the value of the Unsolicited RSS Short SSW Support sub-field is 1. Consequently, as indicated in step S650 in FIG. 20, the STA 200 responds with an unsolicited CBAP-RSS using a short SSW. The short SSW used in the unsolicited CBAP-RSS is the short SSW packet P2 depicted in FIG. 23B, for example, in which the value of the Direction sub-field is 1.

The PCP/AP 100 transmits an SSW-FB in response to receiving the CBAP-RSS. Feedback that is based on the CBAP-RSS received by the PCP/AP 100 is included in the transmitted SSW-FB. Next, the STA 200 transmits an SSW-ACK in response to receiving the SSW-FB, and completes discovery.

Effects

According to embodiment 4, the STA 200 uses short SSW packets instead of SSW frames. In a case where short SSW packets are used, it is possible to reduce the duration of an unsolicited CBAP-RSS compared to the case where SSW frames are used.

It should be noted that the STA 200, if not capable of transmitting short SSW packets, may determine whether or not to execute unsolicited CBAP-RSSs using SSW frames, on the basis of the value of the Unsolicited RSS Enabled sub-field, regardless of the value of the Unsolicited RSS Short SSW Support sub-field of the DMG beacon frames DBcn received from the PCP/AP 100. Furthermore, in order to reduce processing complexity, a STA having few sectors to use may not support unsolicited CBAP-RSSs that use short SSW packets.

Embodiment 5

The PCP/AP 100 and the STA 200 according to embodiment 5 support unsolicited CBAP-RSSs. In embodiment 5, the PCP/AP 100 designates the time of a CBAP in which a CBAP-ISS or an unsolicited CBAP-RSS is executed, by means of the DMG beacon frames DBcn.

Configuration Diagram

Reference will once again be made to FIG. 6. The PCP/AP 100 and the STA 200 according to embodiment 5 are each provided with the antenna array 110, the reception wireless circuit 120, the A/D conversion circuit 130, the physical layer reception circuit 140, a MAC processor 150d, the physical layer transmission circuit 160, the D/A conversion circuit 170, and the transmission wireless circuit 180. Here, constituent elements of the PCP/AP 100 and the STA 200 other than the MAC processor 150d are the same as the constituent elements of the PCP/AP 100 and the STA 200 other than the MAC processor 150 according to embodiment 1 mentioned above with reference to FIG. 6, and descriptions thereof are omitted.

The MAC processor 150d processes MAC frames from reception frame data, and generates MAC frames as transmission frame data in accordance with a MAC protocol. In addition, the MAC processor 150d sends control signals to the physical layer reception circuit 140 and the physical layer transmission circuit 160.

The MAC processor 150d of the PCP/AP 100 generates DMG beacon frames DBcn that include a Next A-BFT field that is set to a value greater than 0, and an Advertised CBAP Start field in which a value indicating a CBAP start time is set, in a BTI.

The MAC processor 150d of the STA 200, in the BTI, processes DMG beacon frames that include the Advertised CBAP Start field having the set value, and generates SSW frames in a DTI after the start time indicated by the value of the Advertised CBAP Start field.

Operation of PCP/AP 100

The STA 200 that executes discovery with respect to the PCP/AP 100 receives the DMG beacon frames DBcn within a BTI-ISS before executing an SLS sequence. The PCP/AP 100, for example, changes the transmission sector for every DMG beacon frame DBcn, in a BTI-ISS carried out every fixed period.

The MAC processor 150d that generates the DMG beacon frames DBcn includes the Unsolicited RSS Enabled sub-field and the Advertised CBAP Start field in the Beacon Interval Control field, for example. Inclusion methods are given hereinafter, for example.

Figure 25A:
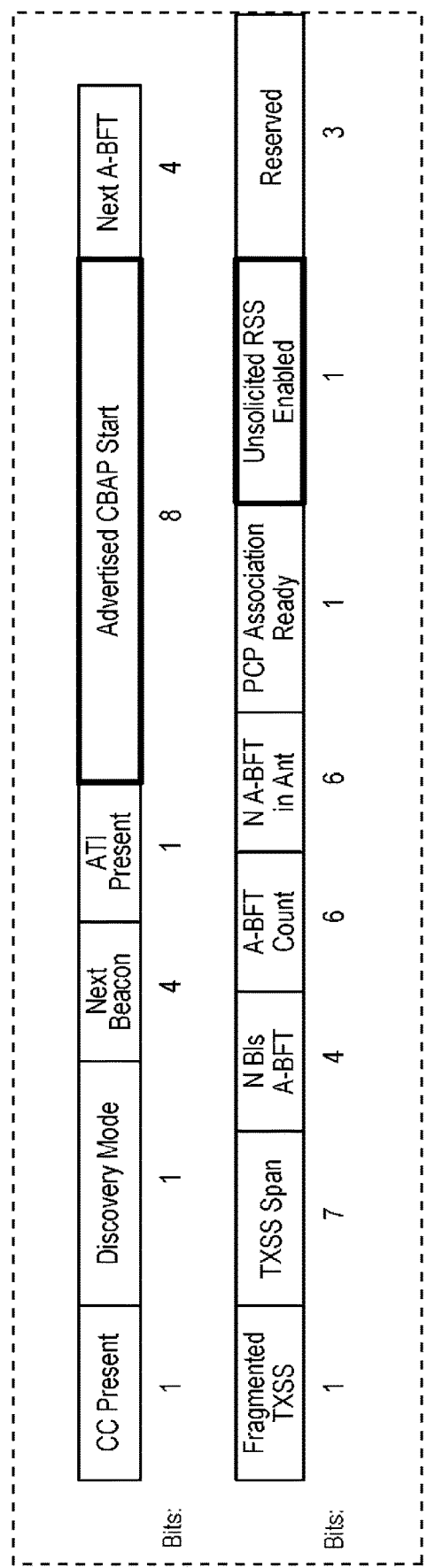
FIG. 25A is a drawing depicting an example of a format (option 1) used for a Beacon Interval Control field according to embodiment 5.
Figure 25B:
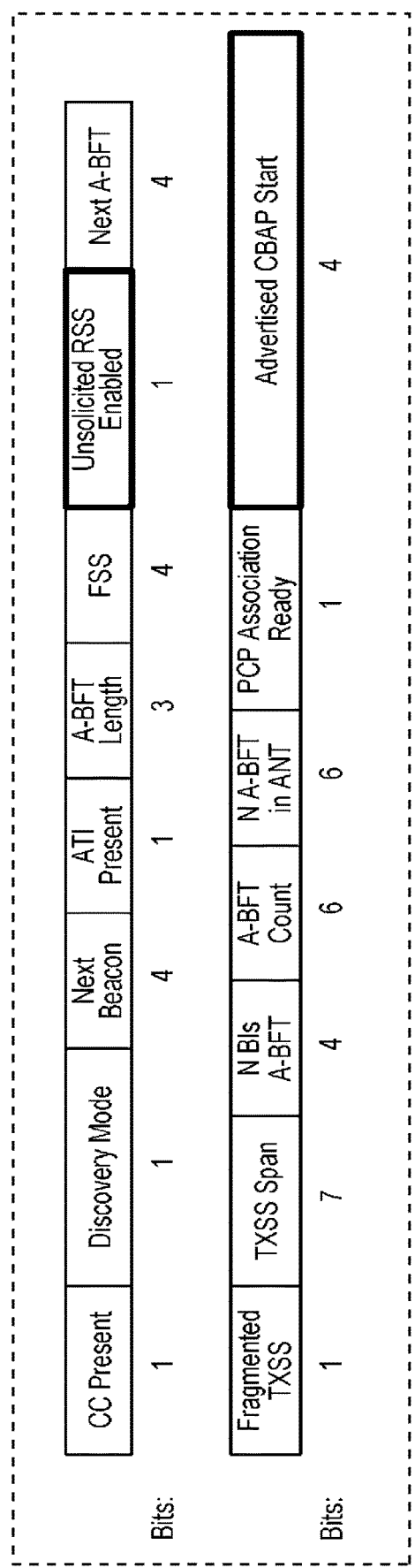
FIG. 25B is a drawing depicting another example of a format (option 2) used for a Beacon Interval Control field according to embodiment 5.

FIG. 25A is a drawing depicting an example of a format (option 1) used for a Beacon Interval Control field F6 according to embodiment 5. FIG. 25B is a drawing depicting another example of a format (option 2) used for a Beacon Interval Control field F7 according to embodiment 5. When the PCP/AP 100 executes a BTI-ISS using DMG beacon frames DBcn in which the value of the Next A-BFT sub-field of the Beacon Interval Control field F1 has been set to a value greater than 0, the STA 200 having received the DMG beacon frames DBcn is able to recognize that an A-BFT period is not included in the BI.

In a case where an A-BFT period is not included in the BI, parameters for A-BFT may be omitted. Consequently, in option 1 and option 2 used in a case where an A-BFT period is not included in the BI, fields that store parameters relating to A-BFT may be omitted. Here, fields that store parameters relating to A-BFT are, for example, an A-BFT Length field, an FSS field, the IsResponderTXSS field, the A-BFT Multiplier sub-field, and the A-BFT in Secondary Channel sub-field included in format A depicted in FIG. 9A.

Thus, in option 1, from among the fields that store parameters relating to A-BFT, the A-BFT Length field, the FSS field, and the IsResponderTXSS field are used and changed to an Advertised CBAP Start field. In addition, from among the fields that store parameters relating to A-BFT, part of the A-BFT Multiplier sub-field and the A-BFT in Secondary Channel sub-field is used and changed to an Unsolicited RSS Enabled sub-field.

Furthermore, in option 2, from the among the fields that store parameters relating to A-BFT, the IsResponderTXSS field is used and changed to an Advertised CBAP Start field. In addition, from among the fields that store parameters relating to A-BFT, the A-BFT Multiplier sub-field and the A-BFT in Secondary Channel sub-field are used and changed to an Unsolicited RSS Enabled sub-field.

Next, the value included in the Advertised CBAP Start field will be described.

FIG. 26 is a drawing describing a value included in the Advertised CBAP Start field according to embodiment 5. As depicted in FIG. 26, the Advertised CBAP Start field is equal to a value of S bits from the N+1th bit of an Allocation Start field, for example.

Here, N is an integer obtained from the length I of the BI and the size S of the Advertised CBAP Start sub-field. The value of I may be signaled by means of the DMG beacon frames DBcn, and may be a predetermined value, for example. The value of S is a predetermined value, and, for example, is 8 in a case where the format of option 1 depicted in FIG. 25A is used, and is 4 in a case where the format of option 2 depicted in FIG. 25B is used.

N is the smallest integer satisfying expression (1) given below. For example, the value of N is 9 in a case where I=102400 microseconds and S=8. In this case, the unit for the value indicated in Advertised CBAP Start is $2^9$=512 (microseconds).

[Expression 1]

$$2^N > \frac{I}{2^S} \quad (1)$$

The start time t of a CBAP is calculated according to expression (2) given next.

[Expression 2]

$$t = [\text{value of Advertised CBAP Start sub-field}] \times 2^N \quad (2)$$

In another example, the value of I may be the length of part of the BI, such as the length of the first half. In another example, the unit for the value indicated in Advertised CBAP Start may be a predetermined value, for example, 1 millisecond.

In one example, in a case where the BI includes a plurality of CBAPs, the value of the Advertised CBAP Start sub-field may be determined so as to indicate the initially broadcast CBAP in the BI.

In one example, a special value may be set in the Advertised CBAP Start field in a case where a CBAP is not present or has not been designated, such as when an A-BFT period is included in the BI, for example. In one example, a special value may be set in the Advertised CBAP Start field in a case where the value of a PCP Association Ready sub-field indicating whether it is possible to receive a PCP association request is 0 (cannot be received).

As described above, by using the Advertised CBAP Start field, the PCP/AP 100 is able to instruct the STA 200 with regard to an intended period for the STA 200 to execute beamforming during discovery.

Furthermore, the PCP/AP 100 is able to set Advertised CBAP Start fields that have been set to different values, within different DMG beacon frames transmitted in the same BTI-ISS. When having received a plurality of DMG beacon frames, the STA 200 may refer to the value of an Advertised CBAP Start field that has been set in a DMG beacon frame having good reception quality (of the best sector), and decide a timing for executing an SLS sequence.

It is thereby possible to vary, over the entire BI, the timing at which SLS sequences are executed by a large number of STAs that each receive different DMG beacon frames.

Operation of STA 200

The STA 200, which has received the DMG beacon frames DBcn in which an Advertised CBAP Start field has been set, starts a CBAP-ISS or an unsolicited CBAP-RSS at the CBAP start time indicated in the Advertised CBAP Start field.

In the case of a CBAP-ISS, the value of the Direction sub-field of the SSW frame F3 is set to 0. In the case of an unsolicited CBAP-RSS, the value of the Direction sub-field of the SSW frame F3 is set to 1. By setting the value of the Direction sub-field to 1, it is indicated that the transmission of the SSW frame F3 has been carried out by a responder (for example, the STA 200 of FIG. 24), and is namely an RSS. In addition, ISS feedback that is based on the received BTI-ISS is set in the SSW Feedback sub-field of the SSW frame F3.

Discovery

FIG. 27 is a drawing depicting an example of an SLS sequence in discovery according to embodiment 5. The PCP/AP 100 transmits a BTI-ISS using DMG beacon frames DBcn generated by the MAC processor 150d. For example, the MAC processor 150d executes step S330 in FIG. 14, and additionally sets a value indicating a time t in the Advertised CBAP Start field, and generates DMG beacon frames DBcn.

As depicted in FIG. 27, the value of the Unsolicited RSS Enabled sub-field of the DMG beacon frames DBcn is 1. Meanwhile, the value of the Next A-BFT sub-field of the DMG beacon frames DBcn is set to something other than 0. It should be noted that, in a BTI-ISS, the DMG beacon frames DBcn do not include an Extended Schedule element. Furthermore, in the generated DMG beacon frames DBcn, as mentioned above, a value indicating a time t is set in the Advertised CBAP Start field.

The STA 200, in response to receiving a BTI-ISS, starts an RSS after the time t indicated in the Advertised CBAP Start field has elapsed. As mentioned above, in the DMG beacon frames DBcn used in the BTI-ISS, the value of the Next A-BFT sub-field is set to something other than 0, and the value of the Unsolicited RSS Enabled sub-field is set to 1. Consequently, with regard to the STA 200, as indicated in step S250 in FIG. 10, the STA 200 responds with an unsolicited CBAP-RSS. The SSW frames used in the unsolicited CBAP-RSS are the SSW frame F3 depicted in FIG. 11, for example, in which the value of the Direction sub-field is 1.

The PCP/AP 100 transmits an SSW-FB in response to receiving the CBAP-RSS. Feedback that is based on the CBAP-RSS received by the PCP/AP 100 is included in the transmitted SSW-FB. Next, the STA 200 transmits an SSW-ACK in response to receiving the SSW-FB, and completes discovery.

Effects

According to embodiment 5, the PCP/AP 100 notifies a CBAP start time in the DMG beacon frames DBcn. The PCP/AP 100 is able to notify a CBAP start time so as to avoid periods allocated for a Service Period (SP), for example, in order to avoid a collision in the BI. The STA 200 that executes discovery uses the notified CBAP start time, and is thereby able to schedule an appropriate time to attempt the execution of an SLS sequence for discovery, and is able to avoid interference.

According to embodiment 5, the PCP/AP 100 reuses fields that store parameters relating to A-BFT in a case where the value of the Next A-BFT sub-field is greater than 0. Due to this reuse, a CBAP start time can be notified without including the Extended Schedule element in a BTI-ISS. Consequently, it is possible to avoid the overhead generated by including the Extended Schedule element, and it is possible to reduce the possibility of a decrease in channel efficiency caused by a transmission sweep. Meanwhile, the STA 200 is able to carry out efficient discovery when an A-BFT period is not included in the BI, and is able to improve the usage efficiency of the BI for data.

Furthermore, according to embodiment 5, the STA 200 is able to execute another operation, such as discovery of the other STA 300, up to the notified CBAP start time, and therefore the STA 200 is able to improve resource usage efficiency. Furthermore, the STA 200 is also able to enter a power saving mode instead of the aforementioned other operation, and is able to reduce power consumption.

Embodiment 6

The PCP/AP 100 and the STA 200 according to embodiment 6 support unsolicited A-BFT-RSSs. In embodiment 6, a field indicating whether or not unsolicited RSSs are enabled and a field indicating whether or not an extended A-BFT period is included are included within the DMG beacon frames DBcn.

Configuration Diagram

Reference will once again be made to FIG. 6. The PCP/AP 100 and the STA 200 according to embodiment 6 are each provided with the antenna array 110, the reception wireless circuit 120, the A/D conversion circuit 130, the physical layer reception circuit 140, a MAC processor 150*e*, the physical layer transmission circuit 160, the D/A conversion circuit 170, and the transmission wireless circuit 180. Here, constituent elements of the PCP/AP 100 and the STA 200 other than the MAC processor 150*e* are the same as the constituent elements of the PCP/AP 100 and the STA 200 other than the MAC processor 150 according to embodiment 1 mentioned above with reference to FIG. 6, and descriptions thereof are omitted.

The MAC processor 150*e* processes MAC frames from reception frame data, and generates MAC frames as transmission frame data in accordance with a MAC protocol. In addition, the MAC processor 150*e* sends control signals to the physical layer reception circuit 140 and the physical layer transmission circuit 160.

The MAC processor 150*e* of the PCP/AP 100 generates DMG beacon frames DBcn that include the Next A-BFT sub-field having a value that is set to 0, an A-BFT Multiplier field having a value that is set to a value greater than 0, and an Unsolicited RSS Enabled field having a value that is set to 0 or 1, in a BTI.

The MAC processor 150*e* of the STA 200, in the BTI, processes the DMG beacon frames DBcn that include the Unsolicited RSS Enabled field having a value that is set to 1, and generates SSW frames that include a Direction sub-field having a value that is set to 1 and feedback that is based on a BTI-ISS, within an extended A-BFT period or an A-BFT period.

Operation of PCP/AP 100

The STA 200 that executes discovery with respect to the PCP/AP 100 receives the DMG beacon frames DBcn within a BTI-ISS before executing an SLS sequence. The PCP/AP 100, for example, changes the transmission sector for every DMG beacon frame DBcn, in a BTI-ISS carried out every fixed period.

The MAC processor 150*e* of the PCP/AP 100 generates DMG beacon frames DBcn that are transmitted by the PCP/AP 100. Furthermore, the MAC processor 150*e* of the PCP/AP 100 sets the value of the A-BFT Multiplier sub-field to a value greater than 0 or to 0, in accordance with whether or not an extended A-BFT period is included in the BI. The remaining operation of the MAC processor 150*e* of the PCP/AP 100 is the same as the operation of the MAC processor 150*a* in embodiment 2, and a description is omitted.

Operation of STA 200

Next, a description will be given regarding the content of processing for RSS execution by the STA 200 having received DMG beacon frames DBcn according to embodiment 6.

Figure 28:
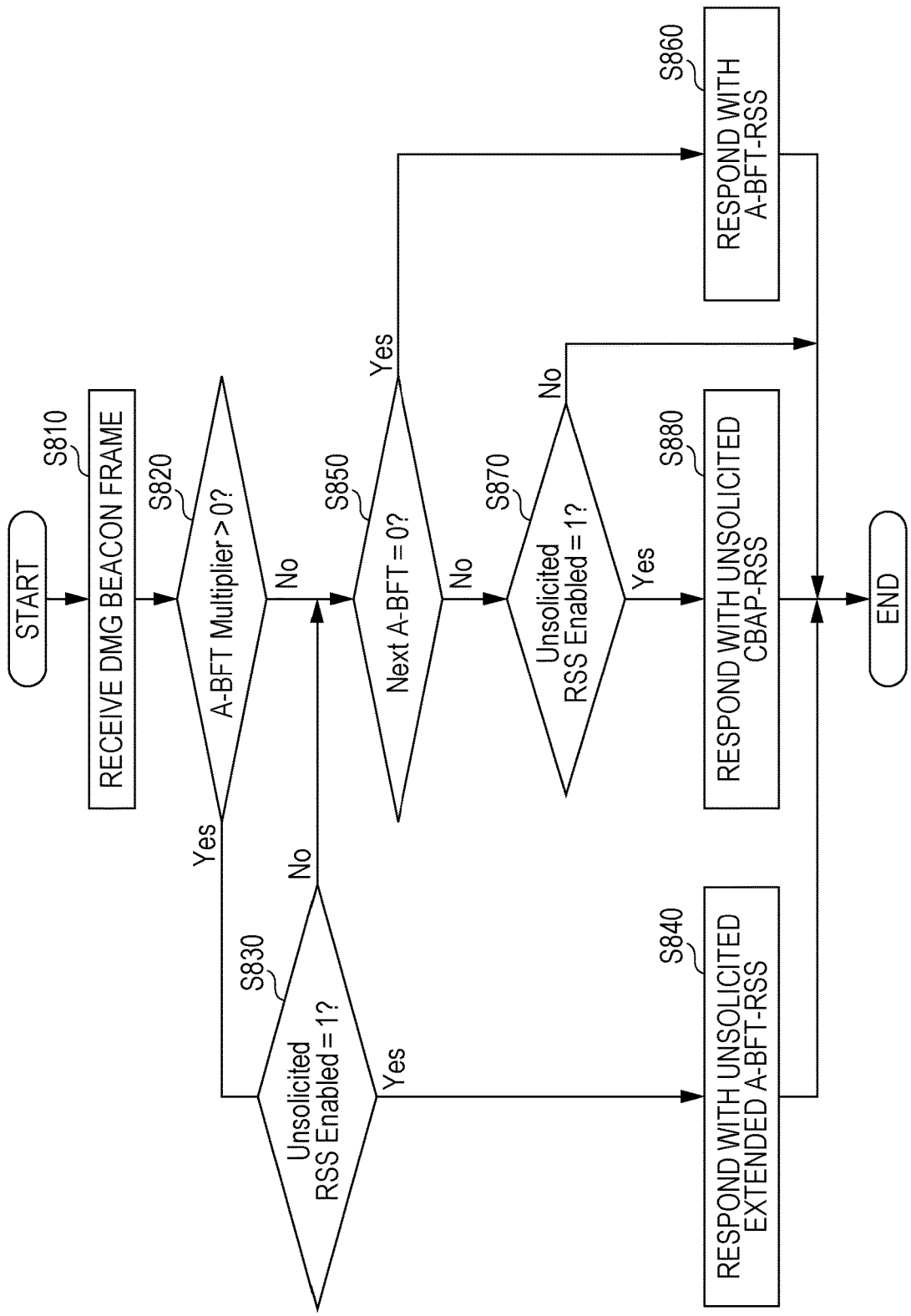
FIG. 28 is a flowchart depicting the operation of a STA according to embodiment 6.

FIG. 28 is a flowchart depicting the operation of the STA 200 according to embodiment 6. In step S810, the STA 200 receives DMG beacon frames DBcn transmitted by the PCP/AP 100.

In step S820, the STA 200 determines whether or not the value of the A-BFT Multiplier sub-field of the DMG beacon frames DBcn is greater than 0.

In a case where the value of the A-BFT Multiplier sub-field is greater than 0 (step S820: yes), in step S830, the STA 200 determines whether or not the value of the Unsolicited RSS Enabled sub-field of the DMG beacon frames DBcn is 1.

In a case where the value of the Unsolicited RSS Enabled sub-field of the DMG beacon frames DBcn is 1 (step S830: yes), in step S840, the STA 200 responds with an unsolicited extended A-BFT-RSS. For example, the STA 200 executes an unsolicited extended A-BFT-RSS using an SLS sequence similar to the SLS sequence that uses unsolicited CBAP-RSSs mentioned above with reference to FIG. 11. Next, the flow ends.

Meanwhile, in a case where the value of the A-BFT Multiplier sub-field is not greater than 0 (step S820: no), or in a case where the value of the Unsolicited RSS Enabled sub-field of the DMG beacon frames DBcn is not 1 (step S830: no), the flow proceeds to step S850. In step S850, the STA 200 determines whether or not the value of the Next A-BFT sub-field of the DMG beacon frames DBcn is 0.

In a case where the value of the Next A-BFT sub-field is 0 (step S850: yes), in step S860, the STA 200 responds with an A-BFT-RSS. For example, the STA 200 executes an SLS sequence that uses the A-BFT-RSS mentioned above with reference to FIG. 1. Next, the flow ends.

Meanwhile, in a case where the value of the Next A-BFT sub-field is not 0 (step S850: no), in step S870, the STA 200 determines whether or not the value of the Unsolicited RSS Enabled sub-field of the DMG beacon frames DBcn is 1.

In a case where the value of the Unsolicited RSS Enabled sub-field is 1 (step S870: yes), in step S880, the STA 200 responds with an unsolicited CBAP-RSS. For example, the STA 200 executes an SLS sequence that uses unsolicited CBAP-RSSs mentioned above with reference to FIG. 11. Next, the flow ends.

Meanwhile, in a case where the value of the Unsolicited RSS Enabled sub-field is not 1 (step S870: no), the flow ends.

Discovery

Figure 29:
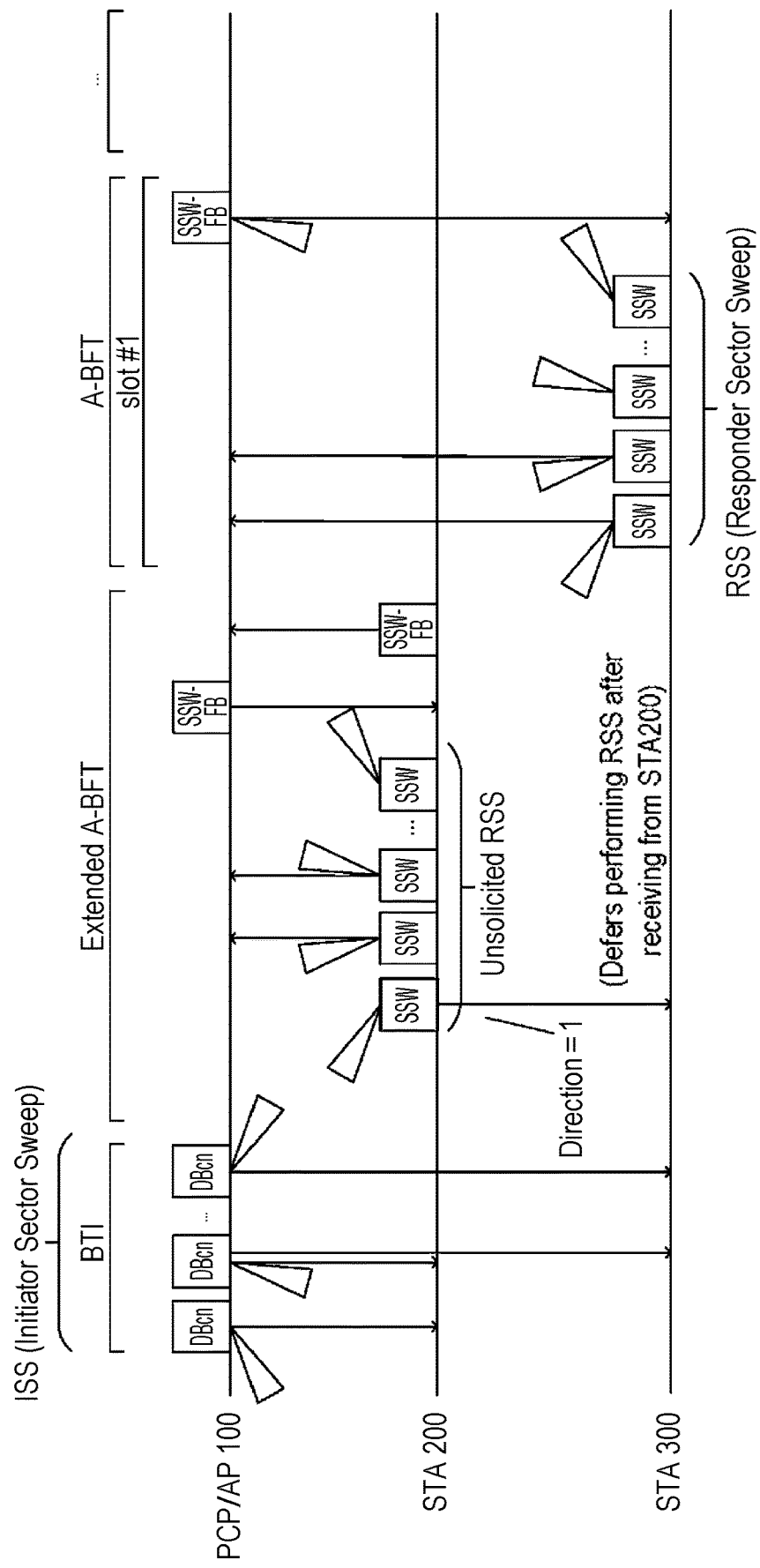
FIG. 29 is a drawing depicting an example of an SLS sequence in discovery according to embodiment 6.

FIG. 29 is a drawing depicting an example of an SLS sequence in discovery according to embodiment 6. The PCP/AP 100 transmits a BTI-ISS using DMG beacon frames DBcn generated by the MAC processor 150e. For example, the MAC processor 150e executes step S330 in FIG. 14 and additionally sets the value of the A-BFT Multiplier sub-field to a value greater than 0 to generate DMG beacon frames DBcn. As depicted in FIG. 29, the value of the Unsolicited RSS Enabled sub-field of the DMG beacon frames DBcn is 1. Meanwhile, the value of the Next A-BFT sub-field of the DMG beacon frames DBcn is set to 0 indicating that an A-BFT period is included in the BI.

The STA 200 and the STA 300 start RSSs in response to receiving the BTI-ISS. As mentioned above, in the DMG beacon frames DBcn used in the BTI-ISS, the value of the A-BFT Multiplier sub-field is set to 0, and the value of the Unsolicited RSS Enabled sub-field is set to 1. Consequently, the STA 200 executes step S840 in FIG. 28, and the STA 200 attempts an unsolicited extended A-BFT-RSS.

For example, as depicted in FIG. 29, the PCP/AP 100 having received an unsolicited extended A-BFT-RSS transmits an SSW-FB. Feedback that is based on the unsolicited extended A-BFT-RSS received by the PCP/AP 100 is included in the transmitted SSW-FB. Next, the STA 300 transmits an SSW-ACK in response to receiving the SSW-FB, and completes discovery.

Meanwhile, in a case where the STA 300 is a legacy STA, an RSS is not executed in an extended A-BFT period. As a result, as depicted in FIG. 29, the STA 300 waits to execute an RSS while the STA 200 attempts an unsolicited A-BFT-RSS in an extended A-BFT period.

In the DMG beacon frames DBcn used in the BTI-ISS, the value of the Next A-BFT sub-field is set to 0, and therefore the STA 300, for example, executes step S230 in FIG. 10, and the STA 300 attempts an A-BFT-RSS.

As depicted in FIG. 29, the PCP/AP 100 transmits an SSW-FB in response to receiving the A-BFT-RSS, and completes discovery.

Effects

According to embodiment 6, an extended A-BFT period is switched to using unslotted access. Channel detection and a backoff procedure are included in unslotted access, and therefore the PCP/AP 100 is able to reduce interference caused by adjacent BSSs. For example, in a case where a large number of adjacent BSSs have been detected, the PCP/AP 100 may enable unslotted access for an extended A-BFT period instead of slotted access.

Furthermore, according to embodiment 6, an extended A-BFT period in which an unsolicited extended A-BFT-RSS is executed is included in a legacy BTI. Consequently, the STA 200 executes discovery efficiently with respect to the PCP/AP 100 even in a case where a legacy STA that does not support extended A-BFT periods is present together with the STA 200.

Each function block used in the description of each of the aforementioned embodiments is typically realized as an LSI, which is an integrated circuit. These may be implemented separately as single chips or may be implemented as a single chip in such a way as to include some or all of the function blocks. LSIs have been mentioned here; however, the function blocks may also be referred to as ICs, system LSIs, super LSIs, or ultra LSIs depending on differences in the degree of integration.

Furthermore, the circuit integration technique is not limited to that of an LSI, and a functional block may be realized using a dedicated circuit or a general-purpose processor. After an LSI has been manufactured, an FPGA (field-programmable gate array) that can be programmed, or a reconfigurable processor with which the connections and settings of circuit cells within the LSI can be reconfigured, may be used.

In addition, if circuit integration technology that replaces LSI appears as a result of another technology that is an advancement in semiconductor technology or is derived therefrom, naturally, the other technology may be used to carry out the integration of functional blocks. Biotechnology applications and the like are also a possibility.

Summary of the Present Disclosure

A wireless communication apparatus according to the present disclosure is provided with: a transmission wireless circuit that transmits a first sector sweep; a reception wireless circuit that receives a second sector sweep; and a control circuit that generates a beacon frame included in the first sector sweep, in which, in a case where the second sector sweep received within an unslotted contention access period by the reception wireless circuit is not a sector sweep in response to the first sector sweep, the control circuit includes, in the beacon frame, a first value indicating whether or not the transmission wireless circuit transmits feedback for the second sector sweep.

In the wireless communication apparatus according to the present disclosure, the first sector sweep is an ISS (Initiator Sector Sweep) transmitted in a BTI (Beacon Transmission Interval), and the second sector sweep is an RSS (Responder Sector Sweep).

In the wireless communication apparatus according to the present disclosure, the first value is included in the beacon frame in a case where an A-BFT (Association-Beam Forming Training) period is not present within a BI (Beacon Interval).

In the wireless communication apparatus according to the present disclosure, the first value is set in an A-BFT Multiplier sub-field or an A-BFT in Secondary Channel sub-field of the beacon frame.

In the wireless communication apparatus according to the present disclosure, the first value is set in an SSW (Sector SWeep) field of the beacon frame.

In the wireless communication apparatus according to the present disclosure, the second sector sweep includes a short SSW packet.

In the wireless communication apparatus according to the present disclosure, the control circuit includes, in the beacon frame, a second value that instructs a time at which the second sector sweep is received.

In the wireless communication apparatus according to the present disclosure, in a case where the second sector sweep received within an extended A-BFT period by the reception wireless circuit is not a sector sweep in response to the first sector sweep, the control circuit includes, in the beacon frame, a third value indicating whether or not the transmission wireless circuit transmits feedback for the second sector sweep.

A wireless communication method according to the present disclosure includes: in a case where a second sector sweep received within an unslotted contention access period by a reception wireless circuit is not a sector sweep in response to a first sector sweep including a beacon frame, including, in the beacon frame, a first value indicating whether or not a transmission wireless circuit transmits feedback for the second sector sweep; and transmitting the first sector sweep.

INDUSTRIAL APPLICABILITY

The present disclosure is suitable for a wireless communication system that carries out communication in accordance with a standard relating to wireless LANs, for example.

REFERENCE SIGNS LIST

100 PCP/AP
110 Antenna array
120 Reception wireless circuit
130 A/D conversion circuit
140 Physical layer reception circuit
150 MAC processor
152 Message generation circuit
154 Message processor
156 Beamforming training control circuit
158 Scheduler
160 Physical layer transmission circuit
170 D/A conversion circuit
180 Transmission wireless circuit
200 STA
300 STA

The invention claimed is:

1. A wireless communication apparatus comprising:
a signal generator which, in operation, generates a Directional Multi-Gigabit (DMG) Beacon frame including a Next Association Beam Forming Training (Next A-BFT) subfield for indicating whether an Association Beam Forming Training (A-BFT) period is present or not in a Beacon Interval, wherein when the Next A-BFT subfield takes a value greater than 0 for indicating that the A-BFT period is not present in the Beacon Interval, the DMG Beacon frame includes an Unsolicited RSS Enabled subfield for indicating support for responding to an unsolicited Responder Sector Sweep (RSS);
a transmitter which, in operation, transmits the generated DMG Beacon frame to a station apparatus during a Beacon Transmission Interval (BTI); and
a receiver which, in operation, receives the Unsolicited RSS from the station apparatus in response to the transmitted DMG Beacon frame with the Unsolicited RSS Enabled subfield set to 1.

2. The wireless communication apparatus according to claim 1, wherein the DMG Beacon frame includes an IsResponder TXSS subfield.

3. The wireless communication apparatus according to claim 1, wherein when the Next A-BFT subfield is set to 0 for indicating that the A-BFT period is present, the DMG Beacon frame does not include the Unsolicited RSS Enabled subfield.

4. The wireless communication apparatus according to claim 1, wherein when the receiver receives the Unsolicited RSS from the station apparatus, the transmitter transmits an SSW feedback in response to the Unsolicited RSS.

5. A wireless communication method for a wireless communication apparatus, the wireless communication method comprising:
generating a Directional Multi-Gigabit (DMG) Beacon frame including a Next Association Beam Forming Training (Next A-BFT) subfield for indicating whether an Association Beam Forming Training (A-BFT) period is present or not in a Beacon Interval, wherein when the Next A-BFT subfield takes a value greater than 0 for indicating that the A-BFT period is not present in the Beacon Interval, the DMG Beacon frame includes an Unsolicited RSS Enabled subfield for indicating support for responding to an unsolicited Responder Sector Sweep (RSS);
transmitting the generated DMG Beacon frame to a station apparatus during a Beacon Transmission Interval (BTI); and
receiving the Unsolicited RSS from the station apparatus in response to the transmitted DMG Beacon frame with the Unsolicited RSS Enabled subfield set to 1.

6. The wireless communication method according to claim 5, wherein the DMG Beacon frame includes an IsResponder TXSS subfield.

7. The wireless communication method according to claim 5, wherein when the Next A-BFT subfield is set to 0 for indicating that the A-BFT period is present, the DMG Beacon frame does not include the Unsolicited RSS Enabled subfield.

8. The wireless communication method according to claim 5, wherein when the wireless communication apparatus receives the Unsolicited RSS from the station apparatus, the wireless communication method comprising:
transmitting an SSW feedback in response to the Unsolicited RSS.

* * * * *